United States Patent
Doyle et al.

(10) Patent No.: US 10,163,053 B2
(45) Date of Patent: Dec. 25, 2018

(54) CODED TAGS ENCODED USING DIFFERENT MAGNETIC MATERIALS AND SYSTEMS OF DETECTING CODED TAGS

(71) Applicant: INTERNATIONAL BUSINESS MACHINES CORPORATION, Armonk, NY (US)

(72) Inventors: Matthew S. Doyle, Chatfield, MN (US); Jeffrey N. Judd, Oronoco, MN (US); Scott D. Strand, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/399,854

(22) Filed: Jan. 6, 2017

(65) Prior Publication Data

US 2018/0197064 A1    Jul. 12, 2018

(51) Int. Cl.
| | |
|---|---|
| *G06K 19/077* | (2006.01) |
| *G06K 19/08* | (2006.01) |
| *G06K 19/073* | (2006.01) |
| *G06K 19/12* | (2006.01) |
| *G07G 1/00* | (2006.01) |
| *G08B 13/24* | (2006.01) |

(52) U.S. Cl.
CPC . *G06K 19/07758* (2013.01); *G06K 19/07345* (2013.01); *G06K 19/086* (2013.01); *G06K 19/12* (2013.01); *G07G 1/0045* (2013.01); *G08B 13/246* (2013.01); *G08B 13/2414* (2013.01)

(58) Field of Classification Search
CPC ....... G06K 19/00758; G06K 19/07345; G06K 19/086; G06K 19/12; G07G 1/0045; G08B 13/2414; G08B 13/246
USPC ................................ 235/492, 487, 380, 449
See application file for complete search history.

(56) References Cited

U.S. PATENT DOCUMENTS

| | | | |
|---|---|---|---|
| 4,727,360 A | 2/1988 | Ferguson et al. | |
| 4,882,569 A | 11/1989 | Dey | |
| 5,253,345 A | 10/1993 | Fernandes et al. | |
| 8,328,106 B1 | 12/2012 | Trujillo | |
| 9,092,683 B2 | 7/2015 | Koziol et al. | |
| 9,142,239 B2 * | 9/2015 | Rubin | G11B 5/746 |
| 9,411,291 B2 | 8/2016 | Wang et al. | |
| 9,702,735 B2 | 7/2017 | Musha et al. | |
| 2008/0068177 A1 | 3/2008 | Copeland | |
| 2013/0087616 A1 | 4/2013 | Lazzerini et al. | |

(Continued)

OTHER PUBLICATIONS

"Electronic Article Surveillance", from Wikipedia, the Free Encyclopedia, May 29, 2016, viewed Jun. 21, 2016, https://en.wikipedia.org/wiki/Electronic_article_surveillance, 6 pp.

(Continued)

*Primary Examiner* — Karl D Frech
(74) *Attorney, Agent, or Firm* — Toler Law Group, PC

(57) ABSTRACT

A coded tag includes a substrate. The coded tag includes a first magnetic material associated with the substrate. The first magnetic material has a first magnetic characteristic and encodes first information. The coded tag includes a second magnetic material associated with the substrate. The second magnetic material encodes second information and has a second magnetic characteristic that is different from the first magnetic characteristic.

20 Claims, 13 Drawing Sheets

(56) References Cited

U.S. PATENT DOCUMENTS

| | | |
|---|---|---|
| 2013/0200606 A1 | 8/2013 | Omar |
| 2015/0079305 A1 | 3/2015 | Wang et al. |
| 2015/0115947 A1 | 4/2015 | Yanagiuchi et al. |
| 2017/0229910 A1* | 8/2017 | Koyanagi ............... H02J 50/10 |

OTHER PUBLICATIONS

"How Much Does an RFID Tag Cost?", Barcoding, Incorporated, 2003, viewed Jun. 21, 2016, http://www.barcoding.com/faq/rfid-tag-cost.shtml, 2 pp.

"MICR (Magnetic Ink Character Recognition)", 2004, viewed Jun. 21, 2016 http://www.barcoderesource.com/micr.shtml, 2 pp.

DeAngelis, Stephen F., "Is RFID Tagging Dead in Consumer Packaged Goods Retailing?", Enterra Solutions, Jul. 26, 2011, viewed Jun. 21, 2016, http://www.enterrasolutions.com/2011/07/is-rfid-tagging-dead-in-consumer-packaged-goods-retailing.html, 13 pp.

Disclosed Anonymously, "I/O Island Method Using Receipt", IP.com, An IP.com Prior Art Database Technical Disclosure, Jun. 4, 2012, 3 pp.

Disclosed Anonymously, "Method by Which Two Dimensional Barcodes Can be Used to Transmit Transaction Data in Lieu of MICR Characters", IP.Com, An IP.com Prior Art Database Technical Disclosure, May 25, 2012, 5 pp.

Disclosed Anonymously, "Walk-Up Creation of Large Format Barcode Images", IP.com, An IP.com Prior Art Database Technical Disclosure, Aug. 25, 2009, 3 pp.

Szczys, M., "Make Your Own Magnetic Ink", Hackaday Jul. 17, 2012, <http://hackaday.com/2012/07/17/make-your-own-magnetic-ink/>, 4 pgs.

"List of IBM Patents or Patent Applications Treated as Related," Sep. 26, 2018, 2 pages.

* cited by examiner

| Magnetic Material Index (501) | Responsive Frequency ($f_i$) (502) | Alphanumeric Value (503) | Code Position (504) | Material Characteristic(s) (505) |
|---|---|---|---|---|
| 1  | $f_1$  | 0 | 1 | U, V       {506} |
| 2  | $f_2$  | 1 | 1 | U, V, Q |
| 3  | $f_3$  | 2 | 1 | U, V |
| 4  | $f_4$  | 3 | 1 | U, V |
| 5  | $f_5$  | 4 | 1 | U, V |
| 6  | $f_6$  | 5 | 1 | U, V, G |
| 7  | $f_7$  | 6 | 1 | U, V |
| 8  | $f_8$  | 7 | 1 | U, V, Q |
| 9  | $f_9$  | 8 | 1 | U, V |
| 10 | $f_{10}$ | 9 | 1 | U, V |
| 11 | $f_{11}$ | A | 1 | U, V |
| 12 | $f_{12}$ | B | 1 | U, V, J |
| 13 | $f_{13}$ | C | 1 | U, V |
| 14 | $f_{14}$ | D | 1 | U, V, C |
| 15 | $f_{15}$ | E | 1 | U, V |
| 16 | $f_{16}$ | F | 1 | U, V           } 507 |
| 17 | $f_{17}$ | 0 | 2 | U, W     {506} |
| 18 | $f_{18}$ | 1 | 2 | U, W, Q |
| 19 | $f_{19}$ | 2 | 2 | U, W |
| ... | ... | ... | ... | ... |
| ... | ... | ... | ... | ... |
| 32 | $f_{32}$ | F | 2 | U, W, P          } 508 |
| 33-48 | $f_{33}$-$f_{48}$ | 0-F | 3 | (various, including U) |
| 49-64 | $f_{49}$-$f_{64}$ | 0-F | 4 | (various, including U) |
| ... | ... | 0-F | ... | ... |
| M-N | $f_M$-$f_N$ | 0-F | X | (various, including U) |

500

FIG. 5

CODED TAGS ENCODED USING DIFFERENT MAGNETIC MATERIALS AND SYSTEMS OF DETECTING CODED TAGS

I. FIELD OF THE DISCLOSURE

The present application relates to coded tags.

II. BACKGROUND

Retailers use a variety of electronic article surveillance (EAS) tags and corresponding detectors to detect or prevent theft of goods. These EAS tags may be electro-magnetic (EM) tags or acousto-magnetic (AM) tags. Both of these types of tags use the principles of magnetism.

EM tags are made by combining a strip of metal having low magnetic saturation value and a ferromagnetic material having a moderate coercive field. An example of a metal having a low magnetic saturation is an amorphous metal. Detection of an EM tag involves sensing and recognizing signals generated by a non-linear magnetic response by an EM tag exposed to a mixture of low-frequency (e.g., 10-1, 000 Hz) magnetic fields.

An EM tag may be deactivated by being demagnetized (e.g., by exposing the EM tag to a magnetic field). The magnetic field biases the amorphous metal strip of the EM tag into saturation such that the EM tag no longer produces harmonics when exposed to a detector emitting the low-frequency magnetic fields and the EM tag can no longer be detected.

Conventionally, detection of an EAS tag is a binary event. That is, a detector determines whether an EAS tag is present or not present at a location near the detector. Other than detection, no information is available from many types of EAS tags.

III. SUMMARY OF THE DISCLOSURE

In a particular implementation, a coded tag includes a substrate. The coded tag includes a first magnetic material associated with the substrate. The first magnetic material has a first magnetic characteristic and encodes first information. The coded tag includes a second magnetic material associated with the substrate. The second magnetic material encodes second information and has a second magnetic characteristic that is different from the first magnetic characteristic.

In a particular implementation, a magnetic detector system includes a transmitter. The transmitter is configured to transmit a first magnetic detection signal at a first magnetic frequency. The transmitter is also configured to transmit a second magnetic detection signal at a second magnetic frequency. The magnetic detector system additionally includes a detector configured to detect a presence of a first magnetic material and a second magnetic material associated with a substrate of a coded tag based on a response from the first magnetic material to the first magnetic detection signal and a response from the second magnetic material to the second magnetic detection signal.

In a particular implementation, a method includes transmitting a first magnetic detection signal at a first magnetic frequency. The method additionally includes transmitting a second magnetic detection signal at a second magnetic frequency. The method additionally includes detecting a first response from a first magnetic material to the first magnetic detection signal, the first magnetic material associated with a substrate of a coded tag. The method additionally includes detecting a second response from the second magnetic material to the second magnetic detection signal, the second magnetic material associated with the substrate of the coded tag. The method additionally includes determining that the coded tag encodes first information based on detecting the first response. The method additionally includes determining that the coded tag encodes second information based on detecting the second response.

IV. BRIEF DESCRIPTION OF THE DRAWINGS

FIG. 5 is a table presenting aspects of a set of magnetic materials according to a first embodiment.

V. DETAILED DESCRIPTION

The present disclosure relates to magnetic conductive identification with application in retail packaging and sales processes among others. Product labels are identified and processed through magnetic conductive identification of coded tags including different magnetic materials.

In one embodiment, magnetically active materials are applied to packaging or a substrate associated with a product or service. For example, a universal product code (UPC) may be printed with different magnetic materials such as different magnetic inks. Accordingly to another example, a tag may include printed advertising or labeling and may include additional magnetic materials that include magnetically active particles in a carrier medium.

In the context of the present disclosure, "magnetic" can refer to a material which is itself a source of a magnetic field. "Magnetizable" can refer to a material which reacts to a magnetic field in the sense of ferro- or ferri-magnetism, without being a source of a magnetic field.

Magnetic materials as used herein may be made with optically variable or orientable magnetic particles or optically variable magnetic inks. Magnetic materials as used herein may be altered through application of an appropriate unstructured magnetic field (e.g., homogeneous) or structured magnetic field (e.g., varying in space, varying in one dimension, varying in two dimensions). Oriented magnetic or magnetizable pigment particles, in the context of the present description, include pigment particles which are present in a coating in an orientation which is different from a result of a conventional printing process that does not use magnetic particles in the inks, pigments, powders, toners or printed matter.

Graphic information includes indicia, patterns, images, and any other type of information which can be visually identified. Magnetic material may be included in graphic information.

Figure 1:
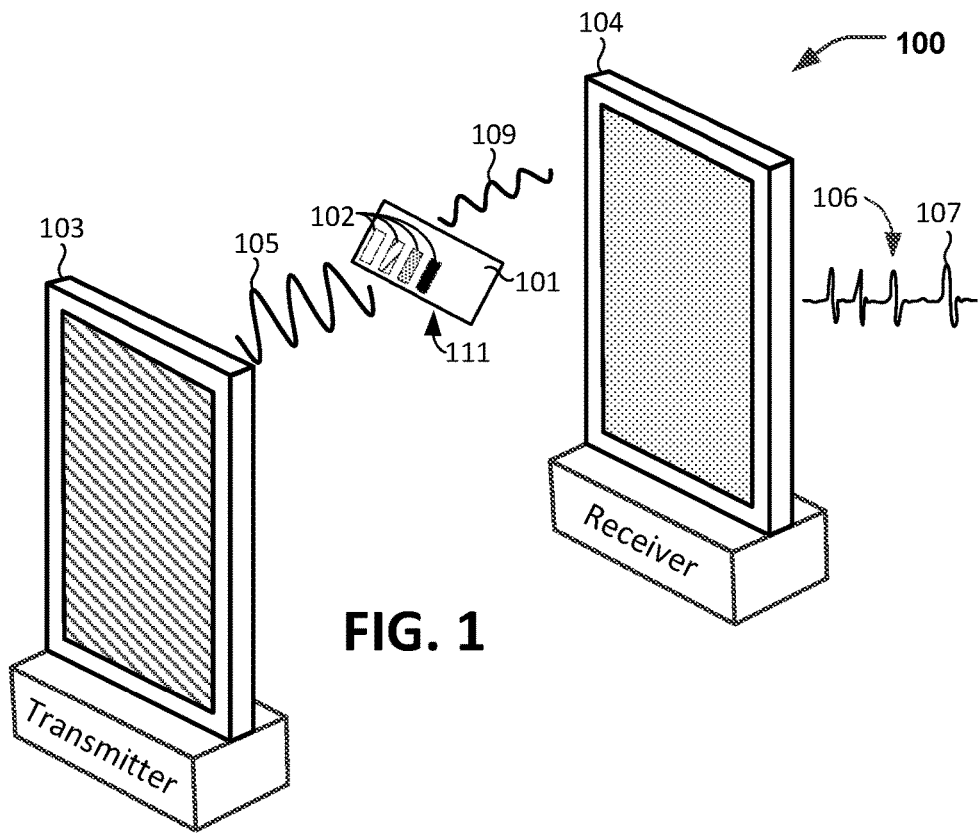
FIG. 1 illustrates a system for detecting multiple magnetic materials or identifiers applied to a substrate.

FIG. 1 illustrates a system 100 for detecting multiple magnetic materials or identifiers of a coded tag 111. The coded tag 111 includes a substrate 101 and magnetic materials 102 associated with the substrate 101. The coded tag 111 (e.g., the magnetic materials 102) may encode information as described in more detail below with reference to FIGS. 2-13. The magnetic materials 102 may be associated with the substrate 101 when the magnetic materials 102 are on, in, coupled to, attached to, bonded to, or written to or on, the substrate 101.

Each material of the magnetic materials 102 has at least one magnetic characteristic that is different from magnetic characteristics of the other magnetic materials of the magnetic materials 102. For example, each magnetic material of the magnetic materials 102 may have a different magnetic resonant frequency at a given applied magnetic field strength than each other magnetic material of the magnetic materials 102. As another example, each magnetic material of the magnetic materials 102 may have a different coercivity than each other magnetic material of the magnetic materials 102. While the magnetic materials 102 are illustrated in FIG. 1 as including four different magnetic materials, the magnetic materials 102 may include more than or less than four magnetic materials.

The coded tag 111 may encode information based on a presence or absence of a particular magnetic material (of N possible magnetic materials from which the magnetic materials 102 may be selected according to a coding scheme) on the coded tag 111. As described in more detail below, the different magnetic characteristics of the magnetic materials 102 cause each magnetic material of the magnetic materials 102 to respond distinctly to interaction with detection signals, enabling the presence or absence of a magnetic material on the coded tag 111 to be determined based on whether particular response signals associated with the magnetic material are detected. A coding system may relate each of the response signals (or the presence of a particular magnetic material on the coded tag 111) with particular information. For example, a coding system may use the presence of a first magnetic material of the magnetic materials 102 on the coded tag 111 to encode first information (e.g., a first alphanumeric value). As another example, the coding system may use the presence of a second magnetic material of the magnetic materials 102 on the coded tag 111 to encode second information (e.g., a second alphanumeric value) that is different than the first information. Thus, the magnetic materials 102 may encode information based on magnetic characteristics of the magnetic materials 102.

In some implementations, the coded tag 111 (e.g., the substrate 101) includes a magnetic saturation component [not illustrated] that is deactivated responsive to magnetizing the magnetic materials 102. In some examples, the magnetic materials 102 of the coded tag may be detectable even though the magnetic saturation component is deactivated.

In some implementations, the system 100 includes a detector that includes both a transmitter 103 and a receiver 104. Although the transmitter 103 is shown in FIG. 1 as a separate component from the receiver 104, in other implementations, the receiver 104 may be physically part of a same structure as the transmitter 103. The transmitter 103 is configured to transmit or emit detection signals 105. In a retail environment, the coded tag 111 may be detected as a retail purchaser carries merchandise (packaged with packaging material that includes the coded tag 111) between the transmitter 103 and the receiver 104 as described in more detail below.

During use, the coded tag 111 (e.g., the magnetic materials 102) may be exposed to the detection signals 105. The detection signals 105 may be transmitted by different radiating elements as described below with reference to FIG. 11. Each signal of the detection signals 105 may be transmitted at a respective frequency of N possible frequencies, where N corresponds to a number (N) of possible magnetic materials that the magnetic materials 102 may be selected from according to a coding scheme employed by the system 100. The N possible frequencies may correspond to a set of N resonant frequencies (at an applied magnetic field strength), where each frequency of the N resonant frequencies is associated with a particular magnetic material of the N possible magnetic materials as described in more detail below with reference to Equation 1.

The magnetic materials 102 of the coded tag 111 may interact with the detection signals 105 and may, in response to the interaction, emit response signals 109. For example, a first magnetic material of the magnetic materials 102 may have a magnetic resonant frequency at a first frequency, and the detection signals 105 may include a first detection signal at the first frequency. The first magnetic material may resonate responsive to interaction of the first detection signal and the first magnetic material, causing the first magnetic material to emit a first signal (of the response signals 109) having a particular signature. As another example, a second magnetic material of the magnetic materials 102 may have a magnetic resonant frequency at a second frequency, and the detection signals 105 may include a second detection signal at the second frequency. The second magnetic material may resonate responsive to interaction of the second detection signal and the second magnetic material, causing the second magnetic material to emit a second signal (of the response signals 109) having a particular signature different than the first signal of the response signals 109. Similarly, each of the other magnetic materials of the magnetic materials 102 may resonate at different frequencies and may emit signals having particular signatures responsive to different signals of the detection signals 105. As another example, the magnetic materials 102 may not include a magnetic material that resonates responsive to a third detection signal at a third frequency. In this example, the response signals 109 may not include a signal that would be emitted by one of the N possible magnetic materials that resonates at the third frequency. Thus, the response signals 109 may be indicative of the magnetic materials 102 included in the coded tag 111.

The receiver 104 detects a result (e.g., the response signals 109) of the interactions of the magnetic materials 102 and the detection signals 105. In some implementations, the receiver 104 is configured to generate an interaction signal 106 based on the interactions between the one or more magnetic detection signals 105 and the magnetic materials 102 (e.g., based on the response signals 109). For example, when the coded tag 111 includes the first magnetic material, the interaction signal 106 may include an indication (e.g., a peak) associated with the first magnetic material (e.g., the first response signal). As another example, when the coded tag 111 includes the second magnetic material, the interaction signal 106 may include an indication (e.g., a peak) associated with the second magnetic material (e.g., the second response signal).

The receiver 104 is configured to analyze the interaction signal 106 to detect one or more of the magnetic materials 102. In some implementations, the receiver 104 detects the presence of the magnetic materials 102 within the detection distance 110 by identifying one or more signature features 107 (e.g., peaks, perturbations, patterns, or tendencies) associated with each of the magnetic materials 102 represented in the interaction signal 106. In some implementations, the receiver 104 decodes the coded tag 111 (e.g., information encoded by the magnetic materials 102) by determining a value associated with each of the magnetic materials 102 that is detected. For example, the receiver 104 may determine that the coded tag 111 encodes the first information (e.g., a first alphanumeric value) based on detecting the first magnetic material of the magnetic materials 102. As another example, the receiver 104 may determine that the coded tag 111 encodes the second information (e.g., a second alphanumeric value) based on detecting the second magnetic material of the magnetic materials 102.

Data indicating the determined information encoded by the coded tag 111 or the decoded values may be sent by the receiver 104 to other components in the system or may be further processed by the receiver 104. The determined information encoded by the coded tag 111 or the decoded values may be used in further processing such as for use in big data analytics, supply chain analytics, security analytics, commerce analytics and so forth as further explained herein. As an example, the receiver 104 or a processor of the detector (e.g., such as a computing component 1111 of FIG. 11) may determine that the information encoded by the coded tag 111 (using the magnetic materials 102) corresponds to a particular product, and the system 100 may send data indicating detection of the product to an analytics processor. As another example, the system 100 may be used in a retail establishment including a security system, and the receiver 104 may send data indicating detection of the coded tag 111 to a security system of the retail establishment. The security system may be configured to trigger an alarm based on conditions (e.g., such as a timestamp) associated with the coded tag 111 as described in more detail below with reference to FIGS. 12 and 13.

Figure 2:
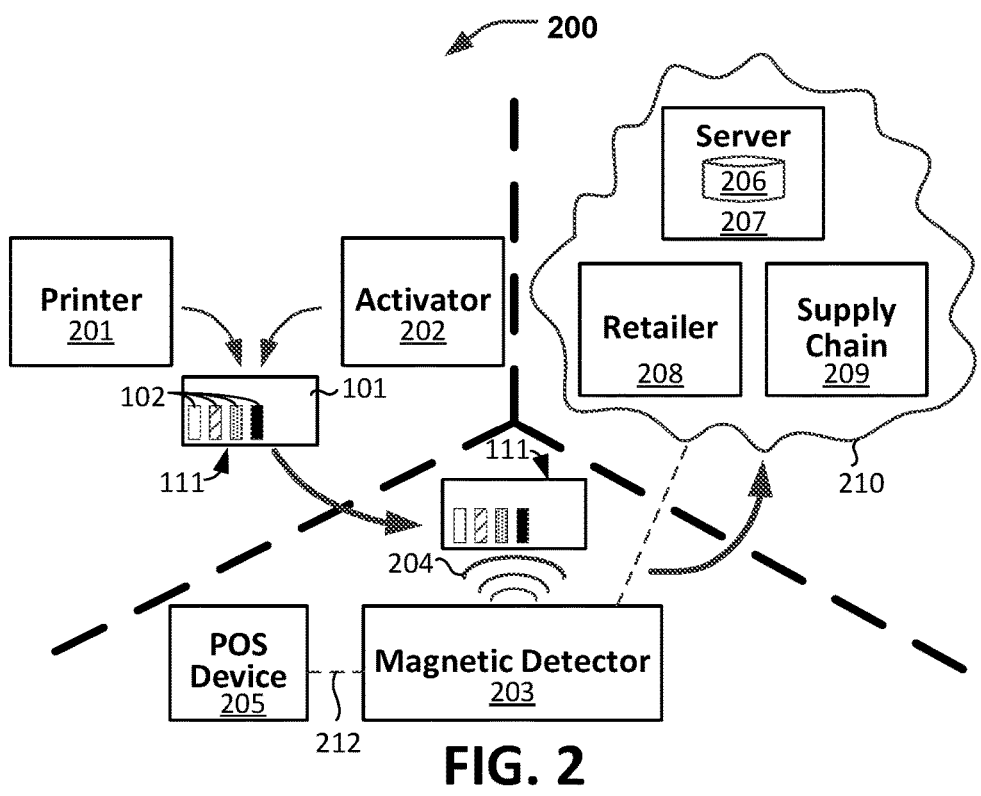
FIG. 2 illustrates an overview of a lifecycle of magnetic identification.

FIG. 2 illustrates an overview 200 of an example of a lifecycle of magnetic identification or detection using the coded tag 111 of FIG. 1. A printer 201 is configured to apply the magnetic materials 102 to the substrate 101 of the coded tag 111. When the coded tag 111 is to be used in a retail application, the magnetic materials 102 may be applied to the substrate 101 before, during, or after packaging of a product (not shown). Once applied, the magnetic materials 102 and the substrate 101 may be activated by exposure to at least one magnetic field provided by an activator 202.

During use, the coded tag 111 may be located near a magnetic detector 203 that includes a transmitter and receiver, such as the transmitter 103 and the receiver 104 of FIG. 1. For example, the coded tag 111 may pass between the transmitter 103 and the receiver 104 of FIG. 1. The magnetic detector 203 may be located in a retail establishment and/or proximate to a point of sale (POS) device 205.

Although the activator 202 is shown in FIG. 2 as being proximate to the printer 201, the activator 202 may be used proximate in time or location to the POS device 205.

Information (e.g., encoded by the magnetic materials 102) about or from the coded tag 111, when activated, is obtained by the magnetic detector 203 as described above with reference to FIG. 1 and below with reference to FIGS. 12 and 13. Once obtained and analyzed, identifying information is passed to other components of the system 200 that are communicatively coupled to the magnetic detector 203. For example, information may be passed to the POS device 205 and other components communicatively coupled to the POS device 205. Additionally, information may be passed to a database 206 operative on a server 207. Information may be passed from the magnetic detector 203 via a communication link (not shown) such as a network computer device working in cooperation with the magnetic detector 203. Alternatively, the magnetic detector 203 may include components that allow the magnetic detector 203 to communicate (e.g., send and receive data, packets, information) with other components in the system.

The information (e.g., the coded information) from or about the coded tag 111 may be passed to a device 208 (e.g., such as a security system) operated by a retailer, to a device 209 operated by a supplier in a supply chain, or both. The POS device 205, the retailer device 208, the supply chain device 209, and the server 207 may be in communication with each other via a network 210 or a network connection 212. Information available to or captured by the POS device 205 may be combined and used with information determined by the magnetic detector 203 based on the coded tag 111. For example, in a security application, as described in more detail below, a UPC code from a UPC label may be used to determine a time of purchase of merchandise associated with the coded tag 111 and the information determined by the magnetic detector 203 based on the coded tag 111 may be used to determine a time of exiting the retail establishment.

Figure 3:
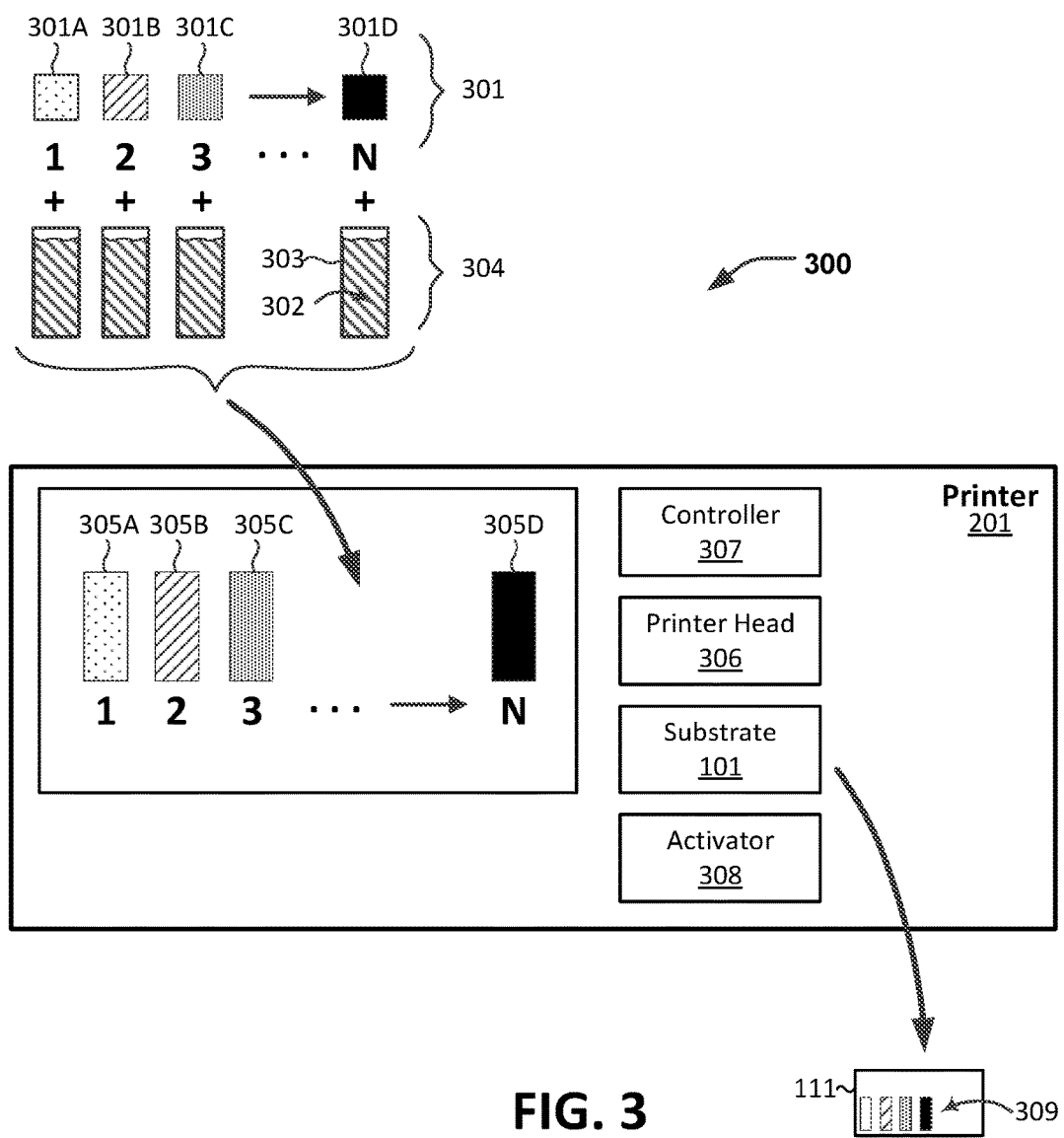
FIG. 3 illustrates a set of magnetic materials for use in a printer or applicator according to a first embodiment.

FIG. 3 illustrates a set of magnetic materials (e.g., such as the magnetic materials 102 of FIGS. 1 and 2) for use in a printer or applicator. In FIG. 3, a set of magnetic ingredients 301 are combined with a carrier ingredient or material 302 in a container 303 to form a set of magnetic materials 305. Each ingredient of the magnetic ingredients 301A-301D has a respective magnetic characteristic that is different from the respective magnetic characteristic of the other ingredients of the magnetic ingredients 301A-301D. For example, a first magnetic ingredient 301A has a first magnetic characteristic (e.g., a first resonant frequency at an applied magnetic field strength) and a second magnetic ingredient 301B has a second magnetic characteristic (e.g., a second resonant frequency at the applied magnetic field strength) that is detectably distinct from the first magnetic characteristic. While four magnetic ingredients 301A-301D are shown in FIG. 3, any number of magnetic ingredients may be used to create a set 301 of magnetic ingredients for the system 300. While a single and homogenous magnetic ingredient is illustrated in FIG. 3, a "magnetic ingredient" such as the first magnetic ingredient 301A may be comprised of a mixture of components as long as the first magnetic ingredient 301A exhibits a first magnetic property when mixed with a carrier 302. The same is true for the second magnetic ingredient 301B, third magnetic ingredient 301C, and Nth magnetic ingredient 301D, and so forth.

A single type of carrier 302 is shown for each container 303 in the set of carriers 304. Although a single type of carrier 302 is illustrated, each container 303 for a respective magnetic ingredient 301A-301D may include a different type of carrier. For example, a first carrier for a first magnetic ingredient 301A may be made of a first substance (or combination of substances), and a second carrier for a second magnetic ingredient 301B may be made of a second substance (or combination of substances). To illustrate, a first carrier may be an alcohol-based carrier, and a second carrier may be an aldehyde-based carrier. A carrier 302 may include several components. For example, a first carrier may include an alcohol-based component and a first pigment. A second carrier may include an aldehyde-based component and a second pigment. A set of magnetic materials 305A-305D is the result of combining a respective magnetic ingredient 301A-301D with its carrier.

The set of magnetic materials 305A-305D is made and installed in a printer or applicator, such as the printer 201 of FIG. 2. In the implementation illustrated in FIG. 3, the magnetic materials 305A-305D are applied to the substrate 101 by mechanical and/or other components of the printer 201 including a printer head 306. The printer head 306 dispenses the magnetic materials 305A-305D by a controller 307. According to an implementation, the controller 307 is provided with instructions by a computer (not illustrated). The instructions may take the form of a design or pattern for placing the respective magnetic materials 305A-305D onto the substrate 101. Although a substrate 101 is illustrated as a single material or single layer in FIG. 3, in other implementations the substrate 101 may be formed of multiple materials or multiple layers. The substrate 101 and placement of the magnetic materials 305A-305D are described in more detail below with reference to FIGS. 6-9.

Subsequent to being applied to the substrate 101, the magnetic materials 305A-305D may be exposed to an activator, such as the activator 308 in the printer 201 as illustrated in FIG. 3, or the activator 202 as illustrated in FIG. 2. The result of exposing the magnetic materials 305A-305D is an activated set of magnetic regions 309 on the substrate 101.

Figure 4:
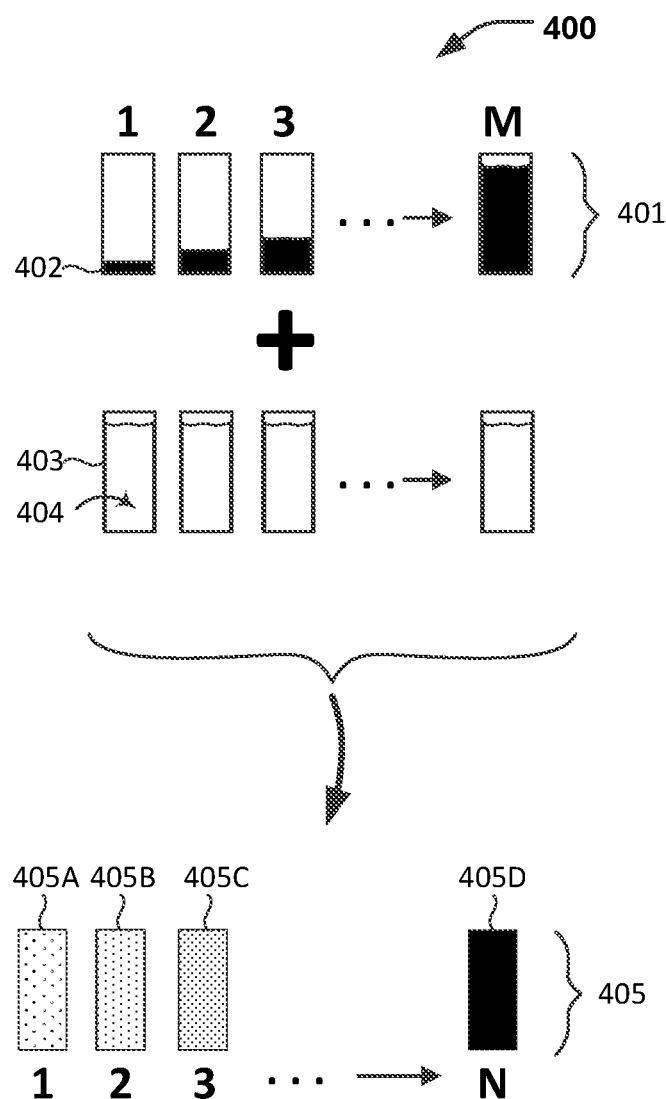
FIG. 4 illustrates a set of magnetic materials according to a second embodiment.

FIG. 4 illustrates a set of magnetic materials (e.g., such as the magnetic materials 102 of FIGS. 1 and 2) according to a particular implementation. In FIG. 4, respective amounts of a set 401 of different amounts of a first magnetic material 402 are added to containers 403 with approximately a same amount of a carrier 404. A first magnetic material 402 may be acicular magnetite, ferric oxide or chromium dioxide. The first magnetic material 402 may also be a magnetite, such as one of Mobay magnetites MO8029™, MO8060™; Columbian magnetites; MAPICO BLACKS™, and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; and Magnox magnetites TMB-100™ and TMB-104™.

Adding the different amounts of the first magnetic material 402 to the carrier 404 results in a set 405 of magnetic materials 405A-405D having different concentrations of the first magnetic material 402. Thus, because each magnetic material of the set 405 of magnetic materials 405A-405D has a different concentration of the first magnetic material 402, each magnetic material of the set 405 of magnetic materials 405A-405D is a different magnetic material than each other magnetic material of the set 405 of the magnetic materials 405A-405D.

In some implementations, the carrier 404 may include a pigment or coloring compound. In these implementations, each of the magnetic materials 405A-405D exhibits a visible property consistent with the included pigment or coloring compound. Alternatively, in other implementations, the carrier 404 is colorless. In these implementations, the magnetic materials 405A-405D are likewise colorless in terms of visible light when applied to a substrate (e.g., such as the substrate 101 of FIGS. 1-3).

Alternatively or additionally, in some implementations, the carrier 404 may include a volatile component that evaporates subsequent to application of the magnetic materials 405A-405D to a substrate (such as the substrate 101 of FIGS. 1-3). In these implementations, the magnetic materials 405A-405D may be used as magnetic inks. The magnetic inks may be applied to a substrate such as packaging, tape, tags, tickets, receipts, stickers, fiat currency (money), boarding passes, passports, identification cards, and the like.

Alternatively or additionally, in some implementations, the carrier 404 may include a solid component that flows under the influence of heat. The various amounts of the first magnetic material 402 are added to, and mixed with, the carrier 404 when the carrier 404 is melted into a liquid state. During application, each of the magnetic materials 405A-405D may be melted and applied as a heated liquid and then allowed to cool into a solid. The resultant solid reflects the magnetic properties of the respective magnetic materials 405A-405D. In these implementations, the magnetic materials 405A-405D may be used in applications of three-dimensional printing, lithography, circuit formation, and the like.

Each of the magnetic materials 305A-305D in FIG. 3 or the magnetic materials 405A-405D in FIG. 4 may be selected, created or developed to be active or resonant according to Equation 1, where $f_n$ corresponds to a resonant frequency of an nth magnetic material of the magnetic materials, $\gamma_n$ corresponds to a gyromagnetic ratio of the nth magnetic material, B corresponds to an applied magnetic field strength, $\mu_0$ represents a magnetic constant (vacuum permeability), and $M_n$ represents a magnetization of the nth material.

$$f_n = \frac{\gamma_n}{2\pi}\sqrt{B(B+\mu_0 M_n)} \quad (1)$$

The resonant frequency $f_n$ is directly proportional to the gyromagnetic ratio of an nth material represented as $\gamma_n$. The gyromagnetic ratio $\gamma_n$ gives a proportionality constant between a magnetic moment and an angular momentum for the nth material. In SI units, the gyromagnetic ratio $\gamma_n$ has units of radian per second per tesla ($rad \cdot s^{-1} \cdot T^{-1}$). The resonant frequency $f_n$ for the nth magnetic material is dependent on the applied magnetic field strength B and on a magnetization M of the nth material which is represented as $M_n$.

FIG. 5 is a table 500 of illustrative frequencies matched to encoded alphanumeric digits (e.g., encoded by the tag 111 of FIG. 1) according to a first illustrative encoding scheme for a set of magnetic materials numbered 1 to N. The magnetic materials 1-N may correspond to the magnetic materials 102 of FIG. 1. In the table 500 of FIG. 5, each magnetic material of the magnetic materials 1-N is capable of being fixedly applied to a substrate, such as the substrate 101 of FIGS. 1-3. The table 500 may be created for a particular substrate, for a collection of substrates, or for a particular type of substrate. As an example, a type of substrate may be paper-based printable packaging. As another example, a type of substrate may be vertical form fill and seal (VFFS) bagging materials that include both polypropylene-based films and polyethylene-based films.

Each magnetic material of the magnetic materials 1-N may be associated with a respective index as illustrated using the indexes in column 501. Each magnetic material of the magnetic materials 1-N is responsive to a respective magnetic detection frequency of the magnetic detection frequencies f1-fN in column 502. The magnetic detection frequency to which a magnetic material is responsive may correspond to a resonant frequency of the magnetic material as described above with reference to Equation 1. Each magnetic material of the magnetic materials 1-N is assigned an alphanumeric value (0-F) 503 corresponding to one of 16 different values. A set of 16 magnetic materials corresponds to a value at any of 1 through X code positions (e.g., of the code encoded by the coded tag 111) as indicated in column 504.

According to the illustrated scheme, a first code position "1" of the code encoded by the encoded tag 111 may refer to a first characteristic for the encoding scheme, and a second code position "2" of the code encoded by the encoded tag 111 may refer to a second characteristic for the encoding scheme. For example, the code position "1" may encode information indicative of a location (e.g., city, combination of city and state, state, country) of a factory that makes a labeled product, and the code position "2" may encode information indicative of a particular type of product (e.g., 1% milk, 2% milk, fat free milk). In FIG. 5, there is a maximum of 16 different locations and a maximum of 16 different product types. As another example, a combination of the first code position "1" and the second code position "2" may encode information indicative of a location, where the first code position "1" may encode a city and the second code position "2" may encode a state or other geographic region. According to the scheme in FIG. 5, only one magnetic material per code position is used on any one substrate.

In FIG. 5, each magnetic material of the magnetic materials 1-N has a signature responsive magnetic frequency as indicated in column 502. The responsive magnetic frequency associated with a magnetic material may correspond to a resonant frequency of the magnetic material as determined according to Equation 1. Each magnetic material of the magnetic materials 1-N has a different responsive magnetic frequency (e.g., a different resonant frequency). For example, a 12th magnetic material is responsive to a magnetic frequency $f_{12}$ that is different from the other magnetic frequencies $f_1$ through $f_N$ in the table 500 and encoding scheme. A magnetic detection frequency is labeled as "responsive frequency" in the table 500.

According to some implementations, a detector (such as the detector described above with reference to FIGS. 1 and 2 or the detector 1100 of FIG. 11) is tuned to identify a presence of particular magnetic material by receiving a response signal at a particular responsive frequency associated with the particular magnetic material as described above with reference to FIG. 1. The detector may be configured to determine an entire code encoded by the coded tag 111 by detecting a presence or absence of a magnetic material of the magnetic materials 1-N for each of the code positions. In the coding scheme illustrated in FIG. 5, the detector assigns a value of zero at a code position only when the detector detects a magnetic material associated with the zero value for the code position (e.g., when the detector detects $f_1$ for the first code position "1"). However, in other encoding schemes, the detector may assign a value of zero at a code position when the detector does not detect a frequency associated with the code position (e.g., when no magnetic materials associated with the code position are detected). In some implementations, one of more of the code positions 1 through X may serve as an error detection or error correction for the other code positions.

Each magnetic material of the magnetic materials 1-N is matched to one or more material characteristics, such as the material characteristics in column 505. For example, material characteristics 506 are associated with a first magnetic material at index 1. The first magnetic material has characteristics U and V. According to the encoding scheme in FIG. 5, all of the magnetic materials 1-N in the table 500 share at least one material characteristic 505—characteristic U. For example, all magnetic materials of the magnetic materials 1-N having material characteristic U may be usable for food packaging. Different tables may be built for different applications based on the material characteristics of a collection of available magnetic materials.

According to another encoding scheme, all of the magnetic materials for the first code position "1" share a common characteristic "V". Characteristic V is unique to the first code position "1". For example, all magnetic materials having material characteristic V are usable as an additive to printable inks for use in a particular type of magnetic ink printer. In FIG. 5, code W is unique to the second code position "2".

In FIG. 5, a certain subset of the magnetic materials 1-N may be selected based on one or more of the material characteristics in column 505. For a particular application, use case, or substrate, a subset of magnetic materials of the magnetic materials 1-N may be selected. A subset of magnetic materials, each matching certain criteria, provides a set of alphanumeric values 503, a set of code positions 504, and a set of magnetic materials possible for an encoding scheme.

Figure 6:
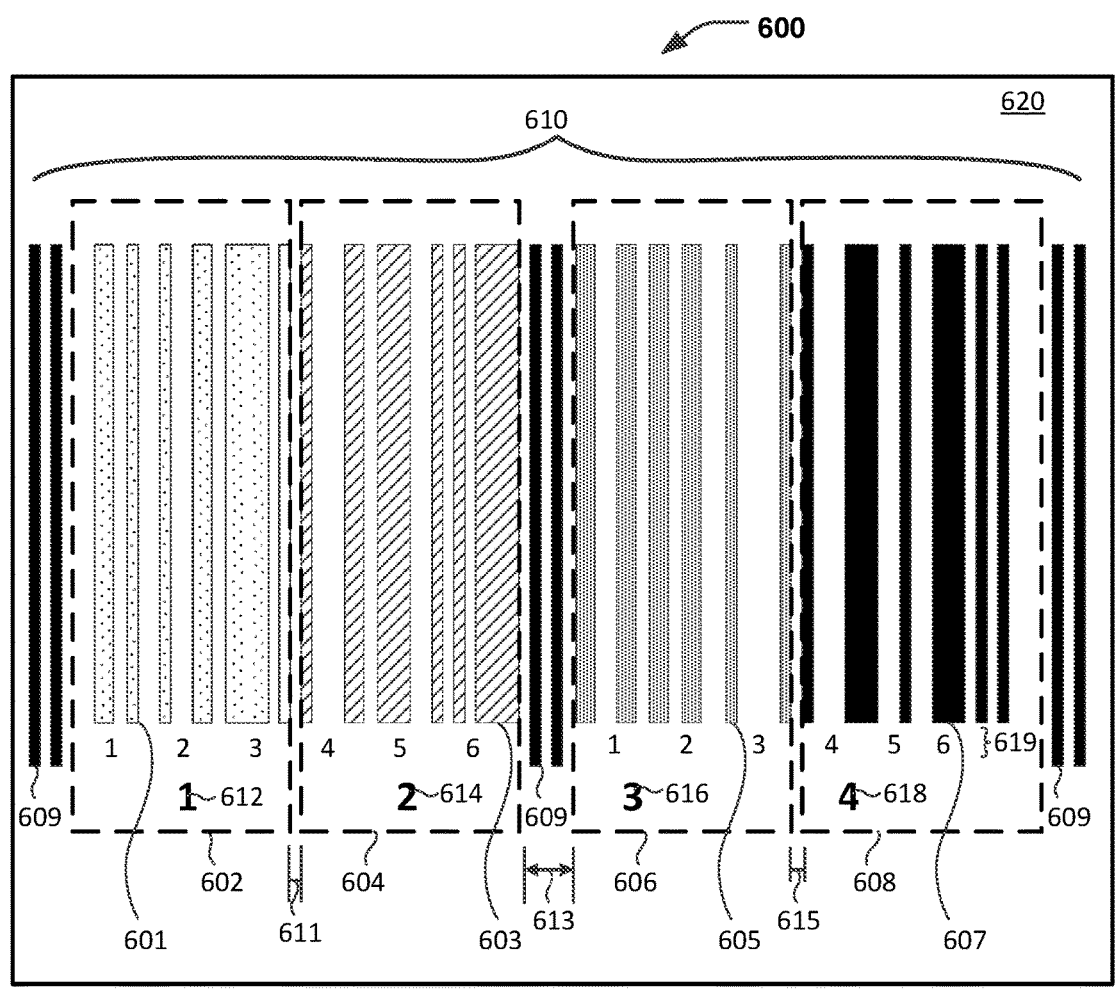
FIG. 6 illustrates a substrate having magnetic materials according to a first embodiment.

FIG. 6 illustrates a coded tag 600 including a substrate 620 (such as the substrate 101 of FIGS. 1-3) having applied thereon magnetic materials, such as the magnetic materials 102 of FIGS. 1 and 2. The coded tag 600 may correspond to the coded tag 111 of FIGS. 1-3. The coded tag 600 may be implemented as a label having a universal product code (UPC) 610. The coded tag 600 includes vertical bounding bars 609 that separate one or more sets of vertical encoding bars 601, 603, 605 and 607. In the implementation illustrated in FIG. 6, the vertical bounding bars 609 do not include magnetic material. Each set of the sets of vertical encoding bars 601, 603, 605, and 607 is formed of a different magnetic material (e.g., having a different resonant frequency) than each other set of the sets of vertical encoding bars 601, 603, 605, and 607. Bounding boxes 602, 604, 606 and 608 indicate regions of the substrate 620. Each of the regions indicated by the bounding boxes is used to encode a different value than each other region indicated by the bounding boxes. Although four magnetic materials corresponding to the four bounding boxes 602, 604, 606, and 608 are illustrated in FIG. 6, in other implementations, a different number of magnetic materials may be used.

In FIG. 6, the magnetic materials are shown as visible printing. However, in other implementations, the magnetic material applied to the substrate 620 may not be visible to the naked eye. The magnetic materials may be applied as part of an ink, toner or other material that is used to print a UPC label 610. Alternatively, the magnetic materials may be applied separately over the top of the UPC label 610.

While the four sets of vertical encoding bars 601, 603, 605, and 607 are shown using four visibly different shading patterns, in practice, the encoding bars 601, 603, 605, and 607 may be indistinguishable by sight and may be (e.g., may only be) distinguishable by magnetic detection (e.g., as described herein). Instead of use of visible light, a magnetic detector uses a magnetic field tuned to one or more particular frequencies to detect each of the four magnetic materials.

The magnetic material of the first set of encoding bars 601 has a first magnetic characteristic and is illustrated using a first shading pattern. The magnetic material of the second set of encoding bars 603 has a second magnetic characteristic and is illustrated using a second shading pattern. The magnetic material of the third set of encoding bars 605 has a third magnetic characteristic and is illustrated using a third shading pattern. The magnetic material of the fourth set of encoding bars 607 has a fourth magnetic characteristic and is illustrated using a fourth shading pattern.

The first bounding box 602 includes UPC bars that respectively encode three of the UPC numbers 619 ("1", "2" and "3"). The second bounding box 604 includes UPC bars that respectively encode the next three UPC numbers 619 ("4", "5" and "6"). The third bounding box 606 includes UPC bars that respectively encode the next three UPC numbers 619 ("1", "2" and "3"). The fourth bounding box 608 also includes UPC bars that respectively encode the last three UPC numbers 619 ("4", "5" and "6"). The UPC number sequence 619 may be matched to the sequence of alphanumeric values encoded by the magnetic materials in the bounding boxes 602, 604, 606, and 608.

Any number of UPC bars, or fraction of UPC bars, may be used to apply the magnetic materials to the substrate 620 as long as a detector is able to detect a presence of magnetic materials and can distinguish each of the magnetic materials.

A presence of the first magnetic material of the first bounding box 602 encodes a first alphanumeric digit 612 such as one of the digits shown and described in reference to table 500 in FIG. 5. For example, the first magnetic material in the bounding box 602 in FIG. 6 may correspond to the magnetic material having index 2 (in FIG. 5) corresponding to digit "1" 612 in FIG. 6. The first magnetic material in FIG. 6 may be the first magnetic material 305A of FIG. 3 or the first magnetic material 405A of FIG. 4.

The first encoded magnetic digit 612 is encoded by the magnetic material in the first set of encoding bars 601. The second encoded magnetic digit 614 is encoded by the magnetic material in the second set of encoding bars 603. The third encoded magnetic digit 616 is encoded by the magnetic material in the third set of encoding bars 605. The fourth encoded magnetic digit 618 is encoded by the magnetic material in the fourth set of encoding bars 607.

The first magnetic material of the first set of encoding bars 601 is separated by a first distance 611 from the second magnetic material of the second set of encoding bars 603 in the second bounding box 604. The second magnetic material of the second set of encoding bars 603 is separated by a second distance 613 from the third magnetic material of the third set of encoding bars 605 in the third bounding box 606. The third magnetic material of the third set of encoding bars 605 is separated by a third distance 615 from the fourth magnetic material of the fourth set of encoding bars 607 in the fourth bounding box 608. The first distance 611, the second distance 613 and the third distance 615 may be different from one another. The magnitude of the distances 611, 613, and 615 may depend on the magnetic properties of the respective magnetic materials, a presence of a resonant metal material, a size of the substrate 620, an amount of each of the respective magnetic materials, or some other factor.

Figure 7:
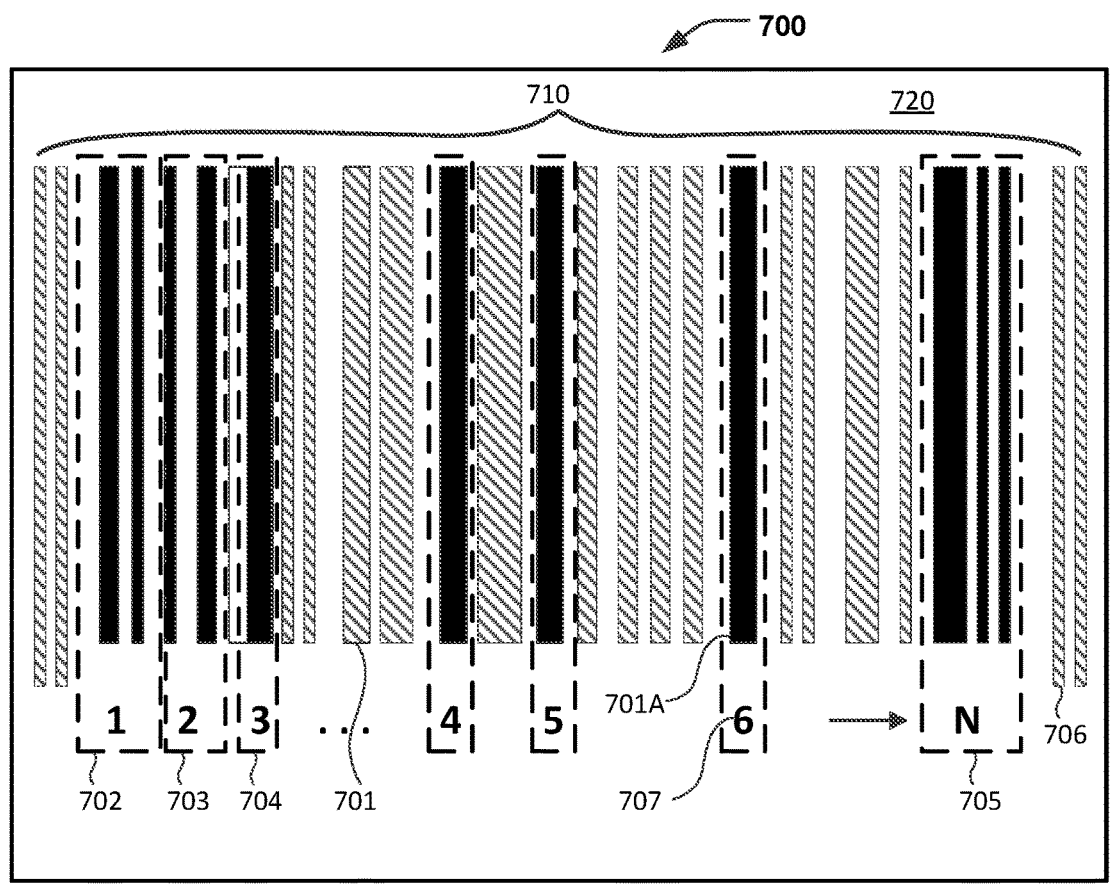
FIG. 7 illustrates a substrate and magnetic materials according to a second embodiment.

FIG. 7 illustrates a coded tag 700 including a substrate 720 having applied thereon magnetic materials. The coded tag 700 may correspond to the coded tag 111 of FIGS. 1 and 2. The coded tag 700 may be implemented as a label having a universal product code (UPC) 710. The coded tag 700 includes vertical bounding bars 706 that separate vertical UPC encoding bars 701. The vertical bounding bars 706 and some of the UPC encoding bars 701 are non-magnetic and are shown in FIG. 7 in a first fill pattern or shading. Solid UPC bars 701A include magnetic materials and are otherwise visually undistinguishable from the non-magnetic UPC elements. That is, magnetic materials are used for printing or forming the UPC on the substrate 720.

An N number of individually identifiable and different magnetic materials are applied to the substrate 720 as indicated by regions 702, 703, 704, and 705. Each of these regions 702-705 includes different magnetic materials that are individually distinguishable from one another. Each of the regions 702-705 may be a same shape and a same size as each other. Alternatively, some or all of the regions 702-705 may be a different shape and a different size relative to each other region. Each magnetic material corresponds to a region 702-705, and respective magnetic materials encode an alphanumeric or numeric value 707 shown as values 1-6 and N in FIG. 7. Magnetic materials may encode any number of values 707.

According to an alternative embodiment, in FIG. 7, each of the regions 702-705 include a same magnetic material applied at a different density relative to another region 702-705, in a different quantity relative to another region 702-705, or according to another scheme that allows each magnetic material of the respective N number of magnetic regions 702-705 to be individually identifiable by a detector or by a combination of detection means.

Figure 8:
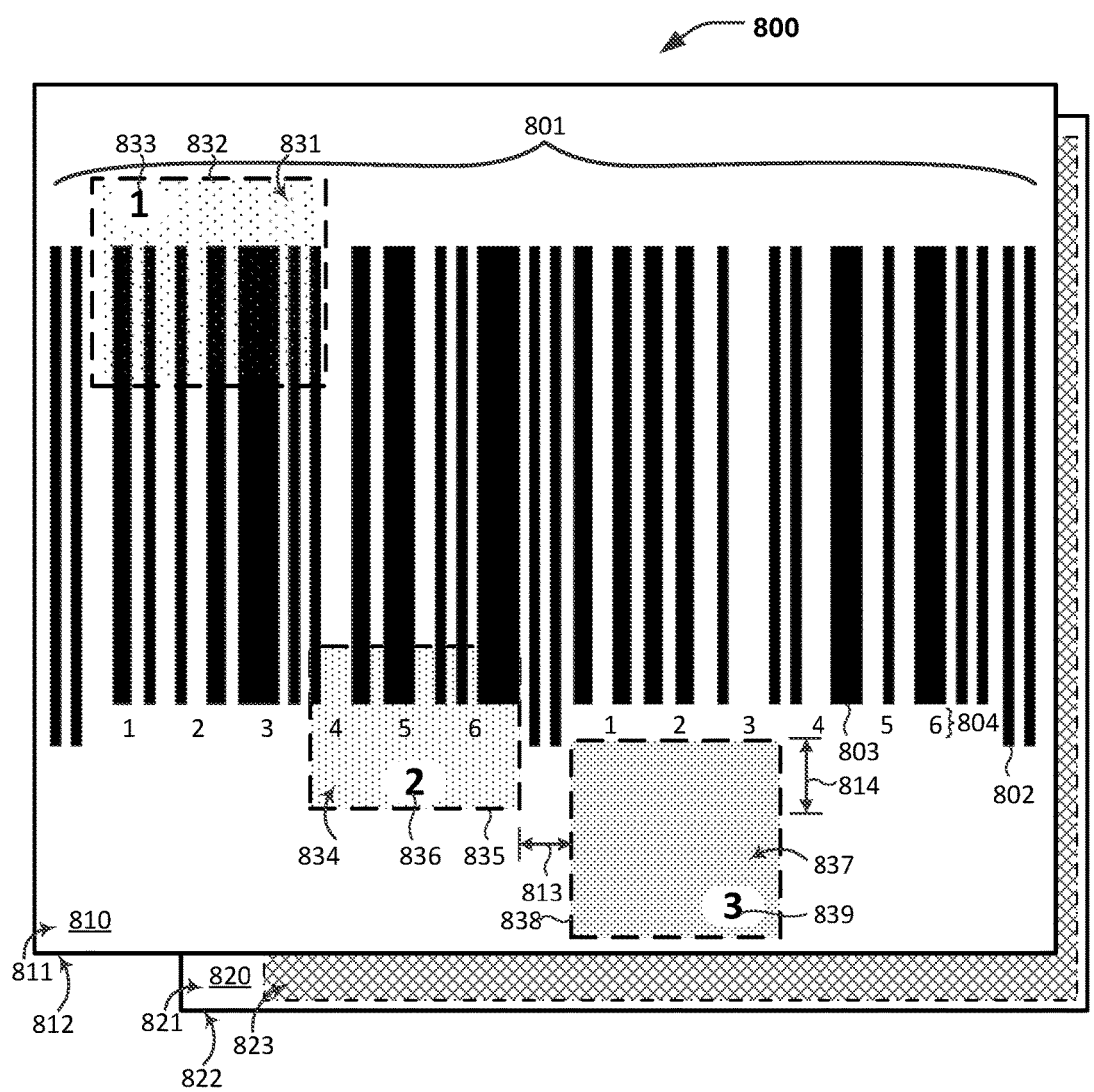
FIG. 8 illustrates a substrate and magnetic materials according to a third embodiment.

FIG. 8 illustrates a coded tag 800 having applied thereon magnetic materials according to a third embodiment. The coded tag 800 may correspond to the coded tag 111 of FIGS. 1-3. The coded tag 800 may be an electro-magnetic tag (EM tag) that includes a first substrate layer 810 and a second substrate layer 820. The first substrate layer 810 includes a first side 811 and a second side 812. The second substrate layer 820 includes a first side 821 and a second side 822. The first side 811 of the first substrate layer 810 includes a UPC 801 applied thereon. The UPC 801 includes UPC bounding bars 802 (e.g., longer bars) and UPC encoding bars 803 (shorter bars). The UPC encoding bars encode a sequence of numeric values 804 represented as value 123456 123456.

The first substrate layer 810, the second substrate layer 820, or both the first substrate layer 810 and the second substrate layer 820 include magnetic materials, such as the magnetic materials 831, 834, and 837. The magnetic materials 831, 834, 837 may be applied to the first side 811 and the second side 812 of the first substrate layer 810. The magnetic materials 831, 834, 837 may also be applied to the first side 821 and the second side 822 of the second substrate layer 820.

The first substrate layer 810 or the second substrate layer 820 may include at least one metal component 823 (e.g., a magnetic saturation component). The at least one metal component 823 may take the form of a strip of metal having a low magnetic saturation value such as an amorphous metal. The at least one metal component 823 may be deactivated (e.g., biased into saturation) responsive to magnetizing the one or more magnetic materials 831, 834, 837 or a ferromagnetic material [not shown] coupled to the at least one metal component 823. For example, during a transaction to purchase merchandise associated with the coded tag 800, the coded tag 800 may be exposed to magnetic fields that magnetize the magnetic materials 831, 834, 837 or the ferromagnetic material, thereby biasing the at least one metal component 823 into saturation (and deactivating the at least one metal component 823). When not deactivated, the at least one metal component 823 may trigger an alarm system, such as at a retail establishment. In some examples, the magnetic materials 831, 834, 837 of the coded tag 800 are detectable despite the at least one metal component 823 being deactivated.

A first magnetic material 831 is applied in a first region 832. A presence of the first magnetic material 831 encodes a first magnetic alphanumeric or numeric digit 833 shown as value 1. A second magnetic material 834 is applied in a second region 835. A presence of the second magnetic material 834 encodes a first magnetic alphanumeric or numeric digit 836 shown as value 2. A third magnetic material 837 is applied in a third region 838. A presence of the third magnetic material 837 encodes a third magnetic alphanumeric or numeric digit 839 shown as value 3. Any number of magnetic materials may be applied to the substrate layers 810 and 820.

The magnetic materials 831, 834, 837 are shown on a first side 811 of the first substrate layer 810 and may be visible thereon. Alternatively or additionally, the magnetic materials 831, 834, 837 are not visible but are placed, for example, on a second side 812 of the first substrate layer 810 and are detectable by a detector.

The magnetic materials 831, 834, 837 are shown as rectangular in shape. However, such is for sake of illustration only. Magnetic materials 831, 834, 837 may be applied in any shape and amount on the first substrate layer 810. According to one embodiment, a change in shape of each of the magnetic materials 831, 834, 837 alters a resulting harmonic signal for the particular magnet material. Each of the magnetic materials 831, 834, 837 is applied to the first substrate layer 810 according to a specific shape and according to a specific amount of a respective magnetic material. According to one embodiment, a standard set of shapes is used for encoding magnetic materials 831, 834, 837 such that each of the magnetic materials 831, 834, 837 should take the form of one of the standard shapes.

Figure 9:
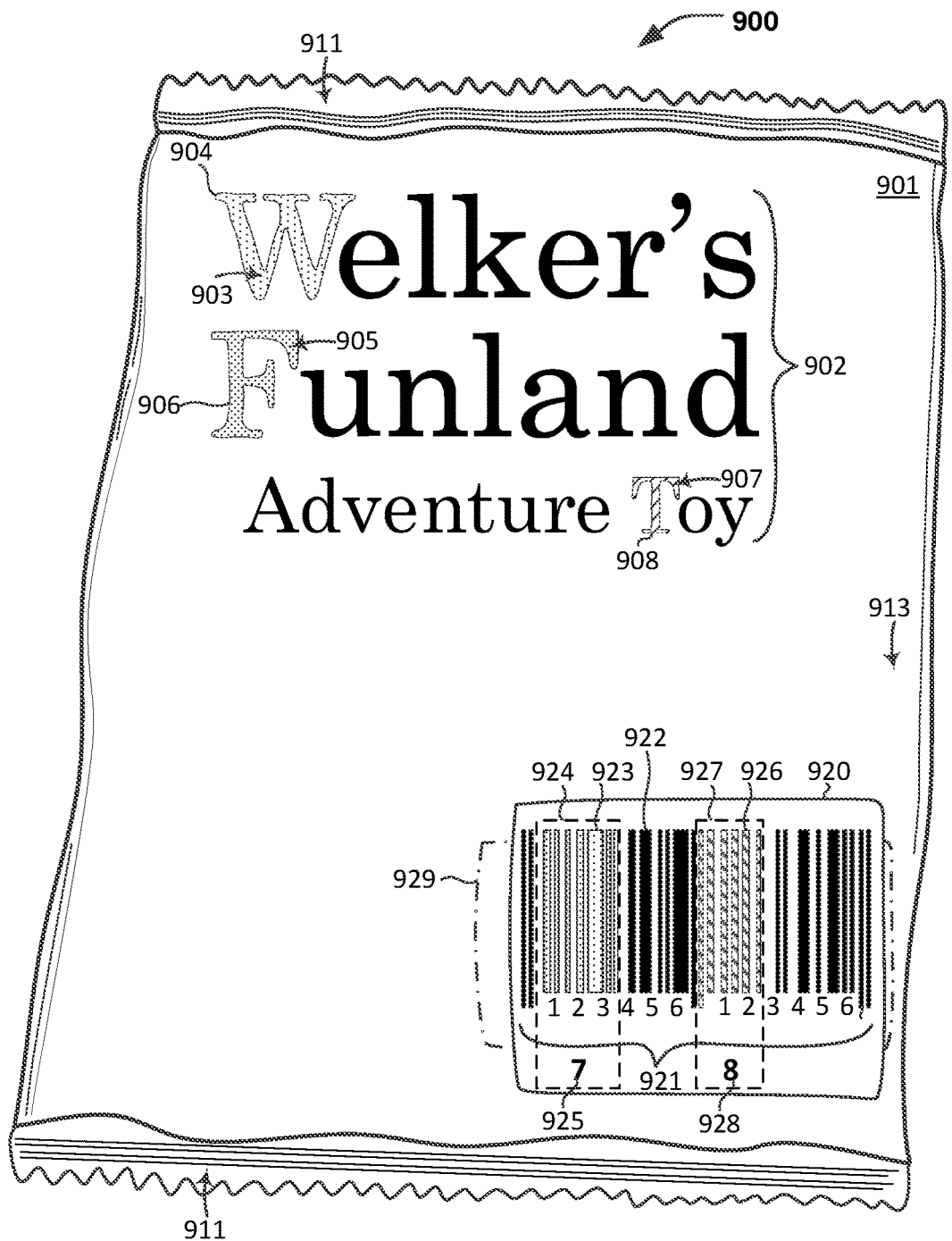
FIG. 9 illustrates a substrate and magnetic materials according to a fourth embodiment.

FIG. 9 illustrates a top view of a package 900 made of a substrate having applied thereon or therein magnetic materials (e.g., such as the magnetic materials 102 of FIGS. 1 and 2). The package 900 includes a package material 901 such as a flow wrapping fin seal film or a vertical form fill and seal (VFFS) film. The package material 901 may include one, two, or more than two layers of material.

Package printing 902 is formed in or on the package material 901. While the package printing 902 is shown as text in FIG. 9, the package printing 902 may include graphics, coloring, logos and so forth. As part of the package printing 902, a first magnetic material 903 is applied over a first area 904 of the package material 901, a second magnetic material 905 is applied over a second area 906 of the package material 901, and a third magnetic material 907 is applied over a third area 908 of the package material 901.

The magnetic materials 903, 905, 907 do not require a line-of-sight magnetic detector or a contact-based detector in order to be detected, but can be read from a distance. The magnetic materials 903, 905, 907 do not detract from conventional printing, packaging and advertising appearance of the package 900. According to a first embodiment, the magnetic materials 903, 905, 907 may be on an outer surface of the packaging material 901. According to a second embodiment, the magnetic materials 903, 905, 907 may be applied to an inner layer, middle layer or to a non-edible product inside the packaging material 901. The magnetic materials 903, 905, 907 may serve as an additional security feature for the package 900.

The magnetic materials 903, 905, 907 may be applied to the package 900 by a first entity (such as by a manufacturer of the product inside the package 900) at a first time. The magnetic materials 903, 905, and 907 may collectively correspond to a first coded tag.

The first magnetic material 903 magnetically encodes a first alphanumeric value (not shown) and visually encodes a second alphanumeric value. For example, a shape of the magnetic material 903 visually encodes the alphanumeric value "W" and a presence of the first magnetic material 903 as detected based on a response of the magnetic material 903 to a particular detection signal (e.g., of the detection signals 105 of FIG. 1) encodes the first alphanumeric value. The second magnetic material 905 magnetically encodes a third alphanumeric value (not shown) and visually encodes a fourth alphanumeric value. For example, a shape of the magnetic material 905 visually encodes the alphanumeric value "F" and a presence of the second magnetic material 905 as detected based on a response of the magnetic material 905 to a particular detection signal (e.g., of the detection signals 105 of FIG. 1) encodes the third alphanumeric value. The third magnetic material 907 magnetically encodes a fifth alphanumeric value (not shown) and visually encodes a sixth alphanumeric value. For example, a shape of the magnetic material 907 visually encodes the alphanumeric value 'T' and a presence of the third magnetic material 907 as detected based on a response of the magnetic material 907 to a particular detection signal (e.g., of the detection signals 105 of FIG. 1) encodes the fifth alphanumeric value.

In some implementations, information may be adequately encoded by each of the magnetic materials 903, 905, 907 when a minimum amount of each of the magnetic materials 903, 905, 907 is applied to the package material 901 (e.g., independent of a size of an area of application of the magnetic materials 903, 905, 907 over or on the package material 901 or a density of the magnetic materials 903, 905, and 907). Alternatively or additionally, in some implementations, information may be adequately encoded by each of the magnetic materials 903, 905, 907 when each of the magnetic materials 903, 905, 907 is applied over or on a minimum area of the package material 901 (e.g., independent of the amount or density of the magnetic materials 903, 905, 907 applied to the package material 901). Alternatively or additionally, in some implementations, information may be adequately encoded by each of the magnetic materials 903, 905, 907 when a minimum density of each of the magnetic materials 903, 905, 907 is applied over or on a minimum area of the package material 901.

Also forming part of, or attached to, the package material 901 is a coded tag 920 (e.g., a second coded tag) including a UPC label. In FIG. 9, the coded tag 920 is shown on a front side of the package 900 but may be located on a back or a side of the package 900. The package printing 902, the coded tag 920, and other elements in FIG. 9 are not necessarily drawn to scale.

The coded tag 920 includes vertical bars 921. At least some of the vertical bars 921 are printed or formed with one or more non-magnetic materials 922 (e.g., non-magnetic ink, toner, pigment). Additionally, at least some of the vertical bars 921 are printed or formed with a first magnetic material 923 over a first region 924. Additionally, at least some of the vertical bars 921 are printed or formed with a second magnetic material 926 over a second region 927. The magnetic materials 923, 926 may be applied by a second entity at a second time subsequent to the first time mentioned above. For example, the magnetic materials 923, 926 may be applied by a retailer who stocks the product within the package 900 for purchase by consumers or other end users.

The vertical bars 921 may optically encode alphanumeric values and magnetically encode alphanumeric values. For example, the vertical bars in the first region 924 may optically encode the alphanumeric values "1", "2", and "3" based on optical detection of the bars in the first region 924, and may magnetically encode a first alphanumeric value 925 (e.g., "7") based on a magnetic detection of (e.g., based on a presence of) the magnetic material 923 in the first region 924. As another example, the vertical bars in the second region 927 may optically encode the alphanumeric values "1" and "2" based on optical detection of the bars in the second region 927, and may magnetically encode a second alphanumeric value 928 (e.g., "8") based on a magnetic detection of (e.g., based on a presence of) the magnetic material 926 in the second region 927.

During operation, a magnetic detector (such as the detector described above with reference to FIGS. 1 and 2 or the detector 1100 of FIG. 11) may be used to detect a presence of the magnetic materials 903, 905, 907 and to detect a presence of the magnetic materials 923, 926. The magnetically encoded values may be used in conjunction with the optically encoded values to provide advanced security capabilities, enhance data analytics, and facilitate better inventory management as further discussed herein.

Figure 10:
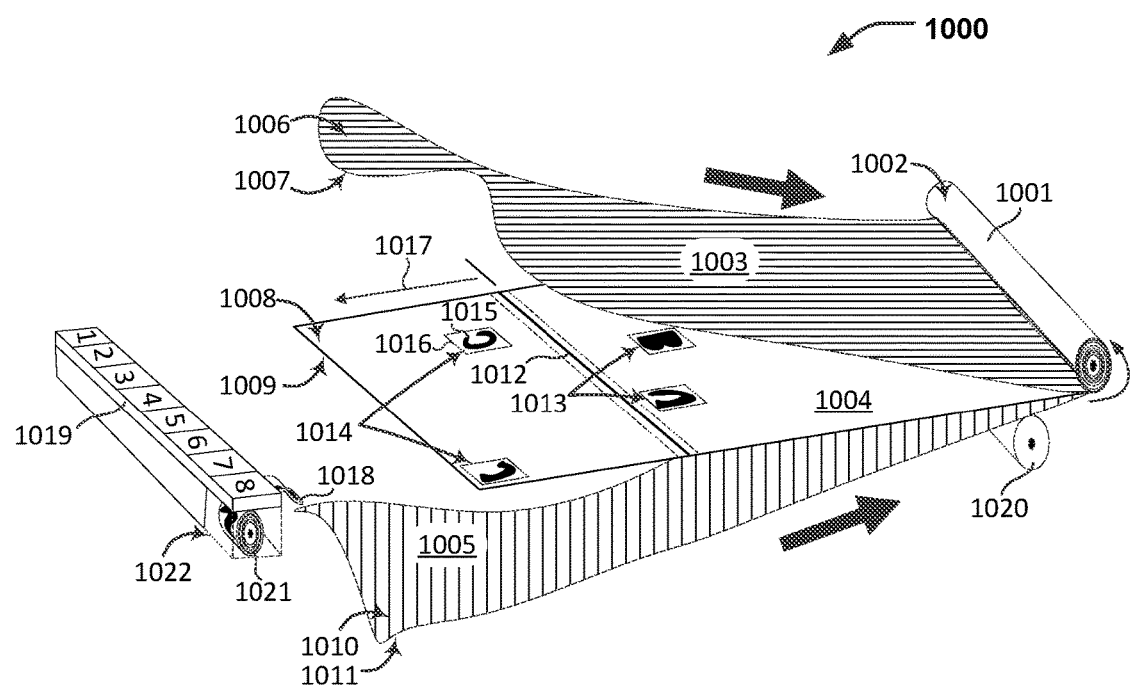
FIG. 10 illustrates a device to couple magnetic materials to packaging materials.

FIG. 10 illustrates a device 1000 and methodology to couple magnetic materials (e.g., such as the magnetic materials 102 of FIGS. 1 and 2) to a packaging material 1001. In FIG. 10, the packaging material 1001 is shown as being formed and collected into a spool 1002 for subsequent use. A subsequent use may include encapsulating a product (not shown) in the package material 1001. According to an example, the packaging material 1001 is a flow wrapping fin seal film or a vertical form fill and seal film.

The packaging material 1001 includes a top layer 1003, a middle layer 1004, and a bottom layer 1005. The top layer 1003 includes a first side 1006 and a second side 1007. The middle layer 1004 includes a first side 1008 and a second side 1009. The bottom layer 1005 includes a first side 1010 and a second side 1011.

The top layer 1003 may be the outside of a finished (e.g., closed, sealed, wrapped, etc.) package, and the bottom layer 1005 may be the inside of the finished package. During assembly of the finished package including the packaging material 1001, the films or layers 1003, 1004, 1005 are pressed together by one or more rollers 1020. During assembly, a tag placing head 1019 dispenses coded tags 1018 (e.g., such as the coded tag 111 of FIGS. 1 and 2). The dispensed coded tags 1018 are placed onto the middle layer 1004. For example, FIG. 10 illustrates coded tags 1013 and 1014 placed onto the middle layer 1004. According to the illustrative embodiment shown, the tag placing head 1019 dispenses the coded tags 1018 from one of several lanes, numbered from 1 to 8 in FIG. 10, as the middle layer 1004 passes close to the tag placing head 1019. Various rollers and structural elements are omitted for sake of clarity to show placement of the coded tags 1013, 1014.

In FIG. 10, a cut line 1012 separates a first unit of packaging from a second unit of packaging. In the implementation illustrated in FIG. 10, two of the coded tags 1018 (e.g., the coded tags 1013) are affixed to a first side 1008 of the middle layer 1004 of the first unit of packaging and two of the coded tags 1018 (e.g., the coded tags 1014) are affixed to the first side 1008 of the middle layer 1004. Using two or more of the coded tags 1018 per unit of packaging may provide an increased tamper resistance relative to packaging that includes only a single coded tag 1018. According to other embodiments, the coded tags 1018 may be placed on either side 1006, 1007 of the top layer 1003; on either side 1008, 1009 of the middle layer 1004; and on either side 1010, 1011 of the bottom layer 1005. The vertical and horizontal distances of the placement of the tags 1013, 1014 may be programmed based on one or more factors. For example, the vertical and horizontal distances may be programmed to limit or prevent interference between responses from respective coded tags 1013 on a first unit and to limit or prevent interference between responses from respective coded tags 1014 on a second unit when a unit is interrogated by a magnetic detector.

In some implementations, each of the coded tags 1013, 1014, 1018 includes a base layer 1016 and multiple magnetic materials 1015 (e.g., such as the magnetic materials 102 of FIGS. 1 and 2). Additionally or alternatively, in some implementations, each of the coded tags 1013, 1014, 1018 includes one, two, or more than two layers of materials such as a magnetic material layer including the magnetic materials 1015, a carrier layer, and an adhesive layer. In the implementation illustrated in FIG. 10, the base layer 1016 of the coded tags 1014 includes a strip of metal having a low magnetic saturation value.

In the implementation illustrated in FIG. 10, each lane of the tag placing head 1019 includes a roll 1021 of the coded tags 1018. Each roll 1021 is placed onto a spindle within a housing of the tag placing head 1019 shown in lane eight in a transparent view 1022. The coded tags 1018 include an adhesive on a bottom side or bottom surface. As each of the coded tags 1018 exits the housing of the tag placing head 1019, a roller (not shown) presses the tag onto a top surface 1008 of the middle layer 1004.

The magnetic materials 1015 are shown in FIG. 10 on a first side or top side of the base layer 1016. Alternatively or additionally, the bottom side of the base layer 1016 may include the magnetic materials 1015 and an adhesive. In these implementations, each of the coded tags 1018 may be dispensed onto a surface 1006-1011 such that the magnetic materials 1015 are not visible (e.g., they are obscured by the base layer 1016). A controller (not shown) operates the tag placing head 1019 using computer instructions. The controller may be controlled by a general purpose computer operating according to a pre-programmed set of instructions.

Each unit of packaging for an entire roll of package material 1001 may contain a same set of coded tags (e.g., the first set 1013 repeated over the entire spool 1002, the second set 1014 repeated over the entire spool). Alternatively, each unit of packaging may include a semi-unique combination of the coded tags 1018 available in the device 1000. As shown in FIG. 10, for two or more tags per unit of packaging, a substantial or large number of possibilities exist. For example, when the tag placing head 1019 has eight lanes, as in FIG. 10, a unit of packaging may have any 2 of 8 available coded tags 1018. As another example, a unit of packaging may have any 2 or 3 of 8 available coded tags 1018. As yet another example, a unit of packaging may have any 2, 3 or 4 of 8 available coded tags 1018. Other numbers of lanes for a tag placing head are possible.

A same set of the coded tags 1018 may be used for an entire particular product line packaged on a certain date. Alternatively, the device 1000 may communicate with, and be controlled by a computer which stores information indicating which of the coded tags 1013, 1014, 1018 are used at a more granular level such as on a per package level. In some examples, a single instance of a product may be tracked by its accompanying coded tags such as a first set of coded tags 1013 or a second set of coded tags 1014.

The coded tags (such as the coded tag 111 of FIGS. 1-3; the coded tag 600 of FIG. 6; the coded tag 700 of FIG. 7; the coded tag 800 of FIG. 8; the first coded tag and the coded tag 920 of FIG. 9; or the coded tags 1013, 1014, 1018 of FIG. 10), the magnetic materials (e.g., such as the magnetic materials 102 of FIGS. 1 and 2; the magnetic materials 305A-305D of FIG. 3; the magnetic materials 405A-405D of FIG. 4; the N magnetic materials of FIG. 5; the magnetic materials described above with reference to FIGS. 6 and 7; the magnetic materials 831, 834, or 837 of FIG. 8; the magnetic materials 903, 905, 907, 923, or 926 of FIG. 9; or the magnetic materials 1015 of FIG. 10), and detector (such as the detector described above with reference to FIGS. 1 and 2 or the detector 1100 of FIG. 11) devices or systems described herein may be used to enhance security. For example, the coded tags may be used in product packaging, banknotes, security cards, passports, identity cards and the like. In some implementations, the magnetic materials may be used to enhance the security of packaged goods such as at a time and place of a retail sale of a packaged product.

Figure 11:
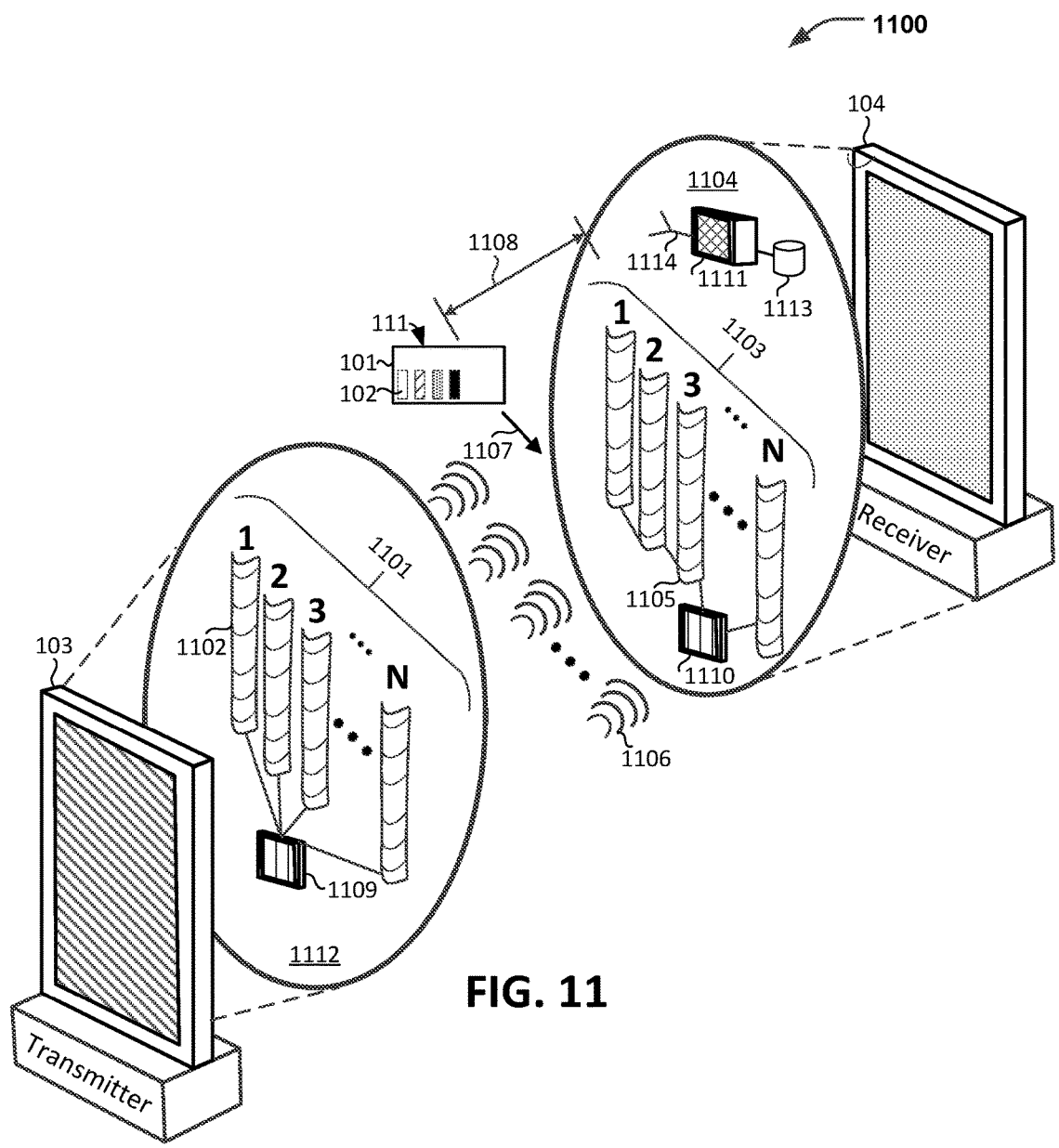
FIG. 11 illustrates a magnetic tag detector according to a first illustrative embodiment.

FIG. 11 illustrates a detector 1100 for detecting one or more coded tags, such as the coded tag 111 of FIGS. 1-3; the coded tag 600 of FIG. 6; the coded tag 700 of FIG. 7; the coded tag 800 of FIG. 8; the first coded tag and the coded tag 920 of FIG. 9; or the coded tags 1013, 1014, 1018 of FIG. 10. For example, a magnetic detector provides increased security in a retail setting through the use of identifiable magnetic materials added to product packaging.

In the implementation illustrated in FIG. 11, the magnetic detector 1100 includes a magnetic signal transmitter 103 and a receiver 104. The magnetic detector 1100 may correspond to the detector 203 shown in FIG. 2. In the implementation illustrated in FIG. 11, the transmitter 103 includes various components including those shown in a first inset 1112. The transmitter 103 includes a series 1101 of individual magnetic transmitters 1102 (e.g., radiating elements) numbered 1 through N. The magnetic transmitters 1102 are illustrated as being oriented vertically and horizontally stacked (e.g., next to each other in a horizontally packed arrangement). Although the magnetic transmitters 1102 are illustrated in a horizontally packed arrangement, the magnetic transmitters 1102 may be arranged in other arrangements. For example, the magnetic transmitters 1102 may be packed in vertical arrangement (e.g., each transmitter of the magnetic transmitters 1102 is oriented horizontally and the magnetic transmitters 1102 are vertically stacked).

The magnetic transmitters 1102 may be operated by a controller 1109. Each of the magnetic transmitters 1102 transmits a respective detection signal 1106 at a particular frequency tuned to a respective magnetic material of the magnetic materials 102. The detection signals 1106 transmitted by the magnetic transmitters 1102 may correspond to the detection signals 105 of FIG. 1. The magnetic materials 102 are attached to a substrate 101 such as the package material 1001 of FIG. 10. During use, the coded tag 111 passes proximate to the receiver 104 (such as in a direction 1107 within a region between the transmitter 103 and the receiver 104). The transmitter 103 transmits or emits a detection signal for each possible magnetic material that the magnetic materials 102 may include according to a coding scheme. For example, the detector 1100 may be configured to detect N possible magnetic materials (e.g., where N>4). Each of the magnetic materials 102 may be one of the N possible magnetic materials detectable by the detector 1100 according to the coding scheme. Each transmitter of the N magnetic transmitters 1102 may transmit or emit a detection signal associated with (e.g., at a resonant frequency of) a corresponding magnetic material of the N possible magnetic materials.

In the implementation illustrated in FIG. 11, the receiver 104 includes various components including those shown in a second inset 1104. The receiver 104 includes a series 1103 of receiving antennas 1105 (e.g., receiving elements) numbered 1 through N. In the implementation illustrated in FIG. 11, the N receiving antennas 1105 are vertically oriented and stacked next to each other. However, in other implementations, the N receiving antennas 1105 may be horizontally oriented and stacked vertically. Each individual receiving antenna of the N receiving antennas 1105 may be operated by a controller 1110. Each individual receiving antenna of the receiving antennas 1105 is tuned to detect a response signal from a respective magnetic material of the N possible magnetic materials that is within a detection distance 1108 from the receiver 104. The detection distance 1108 may be as small as one or two millimeters to as large as several meters such as 10-20 meters. The detection distance 1108 required to reproducibly, reliably and reasonably detect the magnetic materials 102 depends on many factors including, without limitation, the receiver 104 (including receiver tuning), magnetic strength of the magnetic materials 102, orientation of the coded tag 111 or packaging bearing the magnetic materials 102, and combination of these or other factors. According to this implementation, there is an "air gap" between the coded tag 111 and the receiver 104. The receiver 104 operates when the coded tag 111 is in an arbitrary or random orientation with respect to the transmitter 103 and receiver 104.

Each of the response signals from the N possible magnetic materials may have different characteristics (e.g., may have a different frequency) than each of the detection signals 1106. Thus, because the N receiving antennas 1105 are tuned to detect the response signals, the detection signals 1106 (which have different characteristics than the response signals) may not saturate the receiving antennas 1105 or otherwise substantially obscure the response from the coded tag 111. Together, the transmitter 103 and the receiver 104 comprise a tunnel detection scheme.

The receiver 104 detects, identifies, and records an identity of each magnetic material of the magnetic materials 102 that is detected. In some examples, the receiver 104 treats all of the magnetic materials detected within a duration of time as belonging to a particular coded tag. For example, the receiver 104 may detect a presence of all four of the magnetic materials 102 within the duration of time and may thus treat all four of the magnetic materials 102 as being magnetic materials of the coded tag 111. In another example, the receiver 104 may detect a fifth magnetic material (e.g., of N possible magnetic materials from which the magnetic materials 102 may be selected according to a coding scheme) within a duration of time after detection of the last detected magnetic material of the magnetic materials 102 that is greater than the particular duration of time. In this example, the receiver does not treat the fifth material as being a magnetic material of the coded tag 111. Thus, the receiver 104 may treat the coded tag 111 as including all magnetic materials (of the N possible magnetic materials from which the magnetic materials 102 may be selected) that the receiver 104 detects within a particular time window.

In some implementations, the receiver 104 includes a computing component 1111. The receiver 104 (e.g., the computing component 1111) may generate and store a timestamp for each detection event.

Additionally, the receiver 104 (e.g., the computing component 1111) may store information (e.g., encoded by the coded tag 111) that is determined by the receiver 104 based on detection of the magnetic materials 102. For example, the computing component 1111 may process the signal 106 of FIG. 1 to detect indicators (e.g., signatures) associated with the magnetic materials 102. For example, the signatures 107 of FIG. 1 may correspond to signatures associated with the magnetic materials 102, and the computing component 1111 may process the signal 106 to detect the signatures 107, and thereby the magnetic materials 102. The computing component 1111 may decode the coded tag 111 by determining the information associated with each of the detected magnetic materials 102 (e.g., using the table 500 of FIG. 5 as described above) associated with the signatures 107. For example, based on the signatures 107 included in the signal 106 generated by the receiver 104, the computing component 1111 may detect a first magnetic material of the magnetic materials 102 that is associated with (e.g., used to encode) first information (e.g., a first alphanumeric value). The computing component 1111 may determine that the coded tag 111 encodes the first information based on the detector 1100 detecting the first magnetic material. As another example, based on the signatures 107 included in the signal 106 generated by the receiver 104, the computing component 1111 may detect a second magnetic material of the magnetic materials 102 that is associated with (e.g., used to encode) second information (e.g., a second alphanumeric value). The computing component 1111 may determine that the coded tag 111 encodes the second information based on the detector 1100 detecting the second magnetic material.

Data generated by the detector 1100 (e.g., the timestamp, the determined information encoded by the coded tag 111, or both) may be transmitted continuously or intermittently via the computing component 1111 coupled to a network component 1114. Additionally, data may be received, stored and transmitted by the computing component 1111 through the use of a local database 1113. For example, data from a detection event is transmitted from the receiver 104 and computing component 1111 to a server such as server 207 in FIG. 2. Alternatively, data from a detection event may be generated and compared against data in the database 1113. The data from the detection event may be used locally such as for generating an alarm at the detector 1100 when a package including the magnetic materials 102 is not authorized to pass by or through the detector 1100. For example, data indicating a coded tag associated with a particular product may be sent to a security system of a same establishment in which the detector 1100 is located. The security system may process the data to determine whether to trigger an alarm as described in more detail below with reference to FIGS. 13 and 14.

In some implementations, an identification event data structure can be generated and populated by the computing component 1111 in response to a detection event. According to one example, an identification event data structure may include a two-dimensional array of values. Along one dimension of the array are 1 through N possible frequencies corresponding to 1 through N possible magnetic materials of the magnetic materials 102 that may be detected by the magnetic detector 1100 or included on the coded tag 111. Along the second dimension of the data structure are two or more fields including a timestamp of detection and a frequency detected by the receiver 104.

Figure 12:
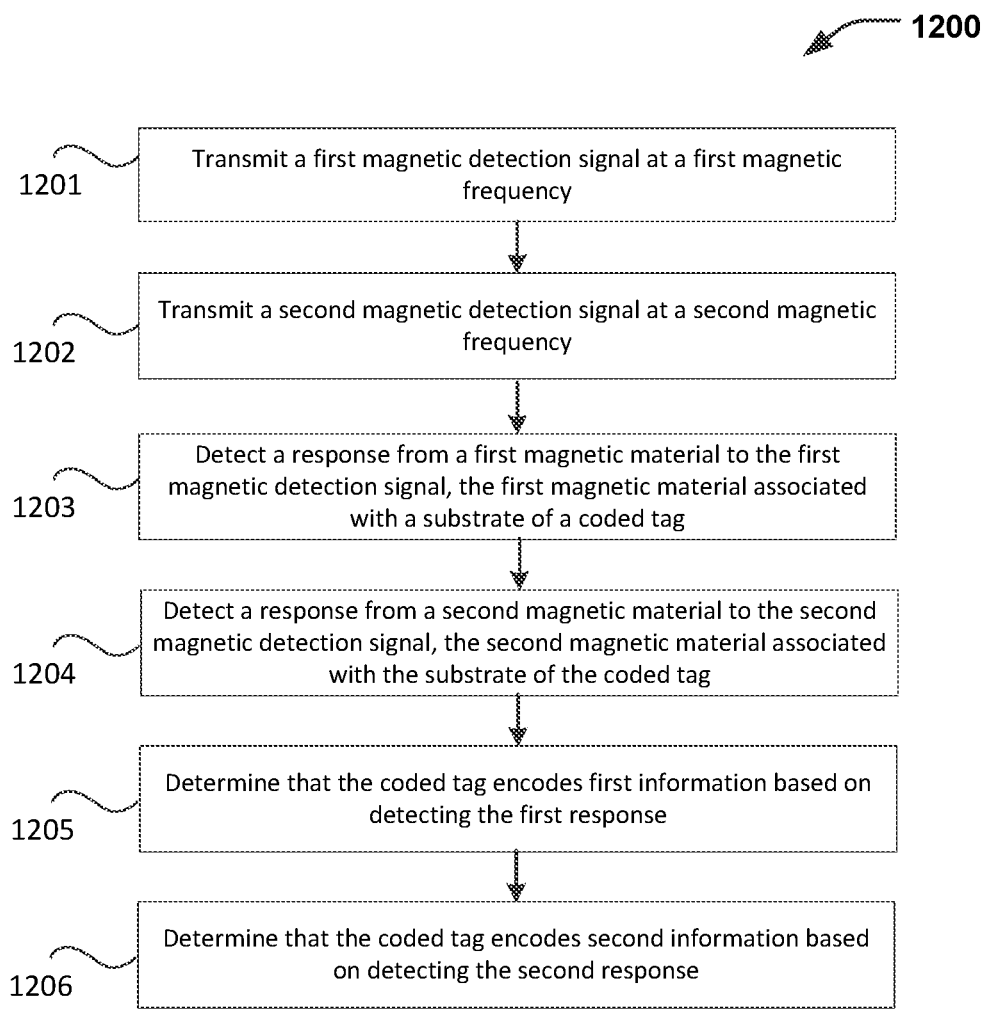
FIG. 12 illustrates a flowchart of a method of detecting different magnetic materials of a coded tag.

FIG. 12 illustrates a method for detecting a coded tag. The method may be performed by the system 100 of FIG. 1 or the detector 1100 of FIG. 11. The coded tag may correspond to the coded tag 111 of FIGS. 1-3 and 11; the coded tag 600 of FIG. 6; the coded tag 700 of FIG. 7; the coded tag 800 of FIG. 8; the first coded tag and the coded tag 920 of FIG. 9; or the coded tags 1013, 1014, 1018 of FIG. 10.

The method 1200 includes, at 1201, transmitting a first magnetic detection signal at a first magnetic frequency. The first magnetic detection signal may be transmitted by the transmitter 103 of FIGS. 1 and 11. The first magnetic frequency may correspond to a magnetic frequency associated with a first magnetic material (of the coded tag). The first magnetic material may correspond to one of the magnetic materials 102 of FIGS. 1 and 2; the magnetic materials 305A-305D of FIG. 3; the magnetic materials 405A-405D of FIG. 4; the N magnetic materials of FIG. 5; the magnetic materials described above with reference to FIGS. 6 and 7; the magnetic materials 831, 834, or 837 of FIG. 8; the magnetic materials 903, 905, 907, 923, or 926 of FIG. 9; or the magnetic materials 1015 of FIG. 10. The first magnetic frequency may be associated with the first magnetic material when interaction of a detection signal (such as the first detection signal of the detection signals 105 described above with reference to FIG. 1) having the first magnetic frequency and the first magnetic material causes the first magnetic material to emit a signal having a particular frequency (e.g., a first response signal frequency).

The method 1200 includes, at 1202, transmitting a second magnetic detection signal at a second magnetic frequency. The second magnetic detection signal may be transmitted by the transmitter 103 of FIGS. 1 and 11. The second magnetic frequency may correspond to a magnetic frequency associated with a second magnetic material associated with the coded tag. To illustrate, the second magnetic material correspond to one of the magnetic materials 102 of FIGS. 1 and 2; the magnetic materials 305A-305D of FIG. 3; the magnetic materials 405A-405D of FIG. 4; the N magnetic materials of FIG. 5; the magnetic materials described above with reference to FIGS. 6 and 7; the magnetic materials 831, 834, or 837 of FIG. 8; the magnetic materials 903, 905, 907, 923, or 926 of FIG. 9; or the magnetic materials 1015 of FIG. 10. The second magnetic frequency may be associated with the second magnetic material when a detection signal having the second magnetic frequency causes the second magnetic material to emit a signal having a particular frequency (e.g., a second response signal frequency) in response to the detection signal being incident on the second magnetic material. The first magnetic signal and the second magnetic signal may be transmitted simultaneously using individual radiating elements as described above with reference to FIG. 11.

The method 1200 includes, at 1203, detecting a response from a first magnetic material (e.g., the first magnetic material described above with reference to 1201) to the first magnetic detection signal. The first magnetic material is associated with a substrate of a coded tag as described above with reference to the magnetic materials 102 and the substrate 101 of FIG. 1.

The method 1200 includes, at 1204, detecting a response from a second magnetic material (e.g., the second magnetic material described above with reference to 1202) to the second magnetic detection signal. The second magnetic material is associated with the substrate of the coded tag as described above with reference to the magnetic materials 102 and the substrate 101 of FIG. 1.

The method 1200 includes, at 1205, determining that the coded tag encodes first information based on detecting the first response. For example, the receiver 104 of FIG. 1 (e.g., the computing component 1111 of FIG. 11) may determine that the first magnetic material (or the first response) is associated with first information, and may determine that the coded tag encodes the first information based on detecting the first response. In some implementations, the receiver 104 may determine that the first magnetic material (or the first response) is associated with the first information using a table (e.g., a look up table), such as the table 500 described above with reference to FIG. 5. In some implementations, the first information corresponds to a first alphanumeric value.

The method 1200 includes, at 1206, determining that the coded tag encodes second information based on detecting the second response. For example, the receiver 104 of FIG. 1 (e.g., the computing component 1111 of FIG. 11) may determine that the second magnetic material (or the second response) is associated with second information, and may determine that the coded tag encodes the second information based on detecting the second response. In some implementations, the receiver 104 may determine that the second magnetic material (or the second response) is associated with the second information using a table (e.g., a look up table), such as the table 500 described above with reference to FIG. 5. In some implementations, the second information corresponds to a second alphanumeric value that is different than the first alphanumeric value.

In some implementations, the method 1200 further includes detecting the coded tag based at least in part on determining the first information and the second information. For example, the receiver 104 (e.g., the computing component 1111 of FIG. 11) may detect the coded tag based on a code that is encoded by the tag using the first and second information. For example, the coded tag may encode a two digit identifier based on a combination of two of N possible alphanumeric values. In this example, the first and second information may correspond to first and second alphanumeric values that are associated with a particular coded tag. Although a two digit identifier is described above, in other examples the coded tag may encode an identifier including more than two (e.g., N) digits by using N different magnetic materials associated with different information (e.g., associated with different alphanumeric values).

In some implementations, the method 1200 additionally includes identifying a product associated with the coded tag based at least in part on the first information and the second information. For example, the computing component 1111 of FIG. 11 may be configured to associate the coded tag with a consumer product based on a look up table that associates consumer products with codes that may be encoded by the coded tag.

In these implementations, the method 1200 additionally includes sending data indicating detection of the coded tag to a security system.

In some implementations, the method 1200 additionally includes generating a timestamp at a time of detection associated with detection of the first magnetic material and the second magnetic material.

In some implementations, the method 1200 additionally includes identifying a first alphanumeric value associated with the response from the first magnetic material and identifying a second alphanumeric value associated with the response from the second magnetic material. The first and second alphanumeric values associated with the responses from the first and second magnetic materials may be identified as described above with reference to FIGS. 1, 2, and 5. In some implementations, identifying the first alphanumeric value includes decoding the first alphanumeric character associated with the first magnetic material based on the first magnetic property. Additionally, in these implementations, identifying the second alphanumeric value includes decoding the second alphanumeric character associated with the second magnetic material based on the second magnetic property.

Figure 13:
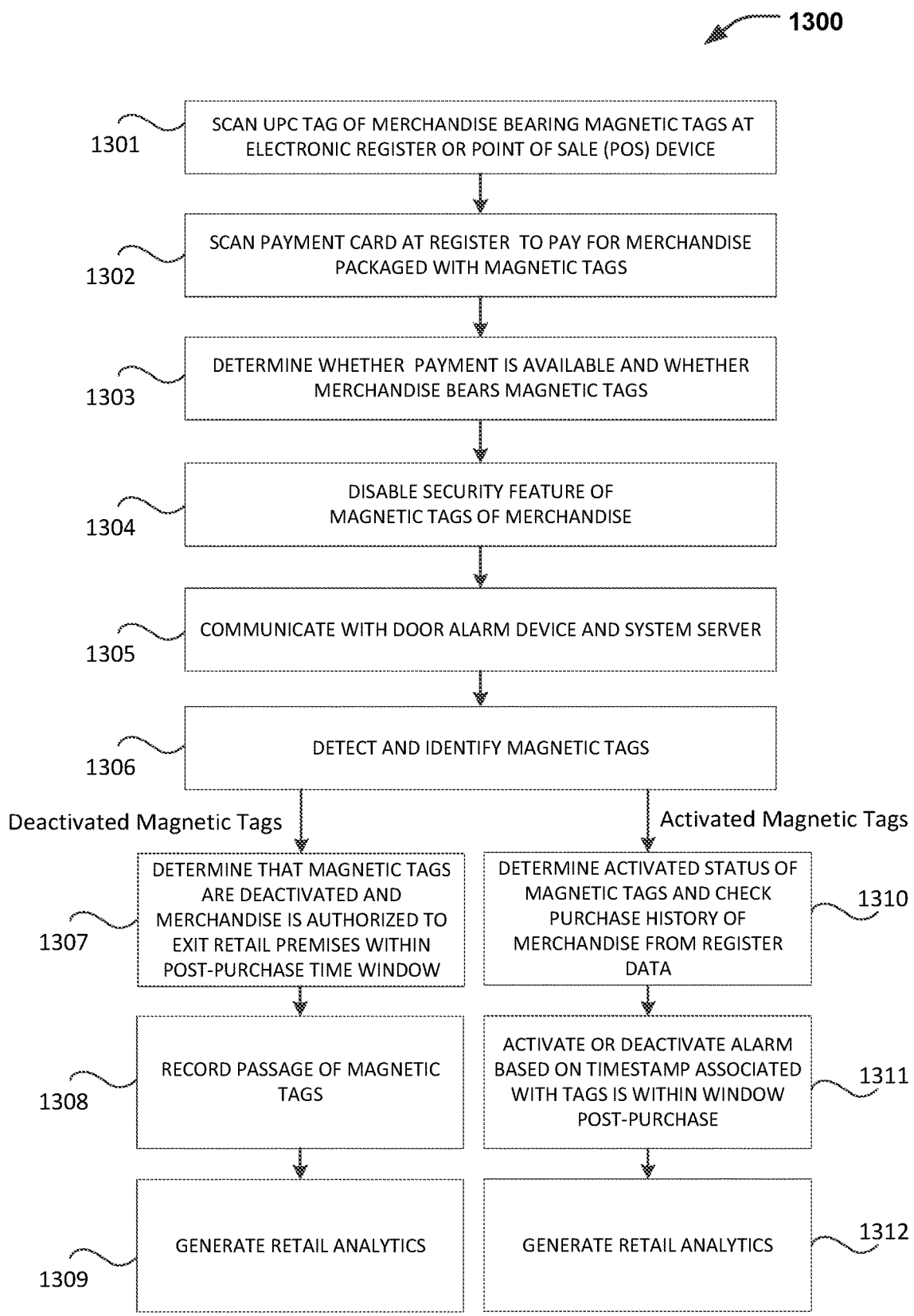
FIG. 13 illustrates a flowchart of a method of use of multiple magnetic materials according to a first embodiment.

FIG. 13 illustrates a flowchart of a method of using a coded tag encoding information using multiple magnetic materials in a retail checkout setting. The coded tags may be attached directly to the packaging of the merchandise or may be a product tag or product label that is separately attached to the product or product packaging. The coded tag may correspond to the coded tag 111 of FIGS. 1-3 and 11; the coded tag 600 of FIG. 6; the coded tag 700 of FIG. 7; the coded tag 800 of FIG. 8; the first coded tag and the coded tag 920 of FIG. 9; or the coded tags 1013, 1014, 1018 of FIG. 10.

In FIG. 13, in a first step 1301, a universal product code (UPC) or bar code is scanned to identify a product or type of product. The value of the UPC is matched to a price for check-out. A timestamp can be recorded along with the value of the UPC. In a next step 1302, a customer's payment card or device is received (e.g., a payment card is scanned, a signal from a mobile phone is detected and decoded) at the register or point of sale (POS) device to pay for the merchandise packaged with the magnetic tags and matched to the value of the UPC.

The method 1300 further includes, at 1303, determining whether the merchandise or the packaging of the merchandise includes a coded tag (e.g., a magnetically coded tag, such as the coded tag 102 of FIGS. 1 and 2). In some examples, the register, the POS device, or another component of the system determines whether the merchandise packaging includes a coded tag based on the value of the UPC. In some implementations, a component of the system matches the value of the UPC to data in the system that associates coded tags with particular merchandise. In some implementations, the system records that the merchandise has been paid for.

The method further includes, at 1304, disabling or deactivating a security feature of the coded tag, such as the at least one metal component 823 of FIG. 8. Disabling or deactivating the security feature may include disabling an alarm that would ordinarily sound upon detection and identification of the particular coded tag as explained further below. Alternatively or additionally, disabling or deactivating the security feature of the coded tag may correspond to saturating a magnetic saturation component of the coded tag such that the magnetic saturation component does not produce harmonics in response to a security signal. Disabling or deactivating the security feature (e.g., the amorphous metal strip, the magnetic saturation component, or the at least one metal component 823) of the coded tag does not prevent detection and decoding of the magnetic materials, such as the magnetic materials 102 of FIGS. 1 and 2, used to encode information.

The method 1300 further includes, at 1305, communicating with a door alarm device and/or a system server. For example, an identifier indicative of the coded tag may be communicated to a door alarm device such as a magnetic detector 1100 of FIG. 11. Additionally at step 1305, the identifier indicative of the coded tag may be communicated to a system server such as the server 207 or one of the other entities in the network 210 in FIG. 2.

The method 1300 further includes, at 1306, detecting and identifying the coded tag. For example, the coded tag may be identified and detected by the magnetic detector 1100 of FIG. 11.

The method 1300 may include different steps depending on whether the coded tag includes a disabled or deactivated security feature. For example, the method 1300 may include performing steps 1307, 1308, and 1309 when the coded tag includes a disabled or deactivated security feature, and the method 1300 may include performing steps 1310, 1311, and 1312 when the coded tag does not include a disabled or deactivated security feature. As described above, a security feature of the coded tag may be disabled or deactivated when the coded tag includes a magnetic saturation component and when the magnetic saturation component is disabled or deactivated (e.g., at checkout).

When the coded tag includes a disabled or deactivated security feature (e.g., when the magnetic saturation component, the amorphous metal, or the at least one metal component 823 is disabled or deactivated as described above), the method 1300 includes, at 1307, determining that the coded tag includes a disabled or deactivated security feature. When the coded tag includes a disabled or deactivated security feature, the method 1300 includes recording, at 1308, passage of the coded tag past the magnetic detector such as a magnetic detector 1100 installed near exits of a retail premises. No alarm is sounded in response to detecting and recording passage of the magnetic tags because the security feature of the coded tag is disabled or deactivated. When the coded tag includes a disabled or deactivated security feature, the method 1300 includes, at 1309, generating retail analytics. For example, retail analytics may include calculating and recording a time duration between a POS transaction and a time that a particular merchandise item leaves the retail premises. As another example, retail analytics includes calculating and recording a time duration between a start time of the particular merchandise item reaching the retail premises and an end time of the particular merchandise item being sold and leaving the retail premises (under an assumption that the magnetic tags were scanned or identified when first arriving to the retail premises or when first placed on the shelf at the retail premises). As another example, retail analytics includes polling inventory at the shelf display, the store back room, the warehouse, or the supply chain in order to signal restocking as necessary or according to a pre-determined or ad hoc restocking scheme.

When the coded tag does not include a disabled or deactivated security feature, the method 1300 includes, at 1310, determining an activated status of the coded tag. For example, a magnetic detector, such as the magnetic detector 1100 of FIG. 11, may recognize that a magnetic saturation component of the coded tag has not been subjected to a magnetic field for deactivation based on a response to a signal that causes the magnetic saturation component to produce harmonics when the magnetic saturation component is not disabled or deactivated.

When the coded tag does not include a disabled or deactivated security feature, the method 1300 includes, at 1311, activating an alarm based on information communicated to the security system by the magnetic detector. For example, as described above, a scanner at the point of sale of the merchandise associated with the coded tag may generate a first time stamp a time of purchase. Additionally, as described above, the magnetic detector may generate a second time stamp indicating when the merchandise is detected by the magnetic detector (e.g., the magnetic detector 1100 of FIG. 11). The security system may determine if the coded tag is detected by the magnetic detector within a particular time window after the time indicated by the first time stamp generated at the point of sale. When the coded tag is detected within a particular time window after the time indicated by the first time stamp (e.g., when the second time stamp is within the particular time window), an alarm may not be generated. For example, during the point of sale, a security feature (e.g., a magnetic saturation component) may inadvertently fail to be activated even though the merchandise is properly purchased. In this example, the method 1300 uses information associated with detection of the coded tag to prevent a false alarm. Alternatively, when the coded tag is detected outside of the particular time window after the time indicated by the first time stamp, an alarm may be generated.

When the coded tag does not include a disabled or deactivated security feature, the method 1300 additionally includes, at 1312, generating retail analytics. For example, when the alarm is not generated despite the security feature not being disabled, an indication of unsuccessful deactivation of the security feature may be generated. By performing the steps of the method 1300, a magnetic detector provides additional data into a retail system not previously possible by other means.

The use of magnetic materials and magnetic tags as described above is adaptable for use with paper-based documents and financial instruments of all varieties such as stock certificates, bonds, loan documents, deeds to property, affidavits, banknotes (fiat currency), contracts, passports, diplomas, birth certificates, marriage certificates, wills, government issued documents, and so forth. Further, magnetic materials and magnetic tags are also adaptable for use in concert tickets, travel (e.g., airline, subway, train) tickets and so forth. Use of magnetic materials as described herein assists to prevent unauthorized reproduction and tampering of physical instruments, financial instruments and valuable documents. Fraud prevention continues to be a significant concern to financial, business and government institutions. Use of magnetic materials as described herein provides an extra means of authentication and fraud prevention.

A procedure for use of magnetic materials in documents would work as follows. During creation of the document, magnetic materials would be printed or added to the documents according to a pre-determined pattern corresponding to a two-dimensional or three-dimensional layout within the document.

Subsequent to creation of the document (e.g., during authentication of the document), the document including the magnetic materials or magnetic tags would be "activated" ensuring that the magnetic materials were responsive to a transmitter and detectable by a receiver. Then, the document would be exposed to a transmitter and receiver such as those provided by the magnetic detector of FIG. 11. The receiver would then provide a computing device with the numbers or alphanumeric values encoded in the magnetic materials.

Detected encoded values could then be matched against values securely stored by an authorized device or authorized party. A single purpose magnetic detector for documents could be a modestly sized device that would fit on a counter top or inside of an automated machine. A magnetic detector is currently available in many mobile phones. A software application can be provided for mobile phones and a magnetic detector within a mobile phone is adaptable so as to transform a mobile phone into a magnetic detector for detecting and obtaining an identity of a plurality of magnetic materials as described herein.

According to a first embodiment, magnetic materials are applied so that magnetic detection and identification can only be performed at close range such as within one centimeter of a magnetic detector. According to a second embodiment, magnetic detection and identification can be performed at a distance of approximately three meters or less. For magnetic materials that need to be activated before detection and identification, at the end of successful detection of the magnetic materials in a document, the magnetic materials could be deactivated such that the document could not be readable unless re-presented to another activating and authenticating machine. In this way, no magnetic detection of the magnetic materials of the document could occur at a distance and skimmed by any unauthorized party.

Figure 14:
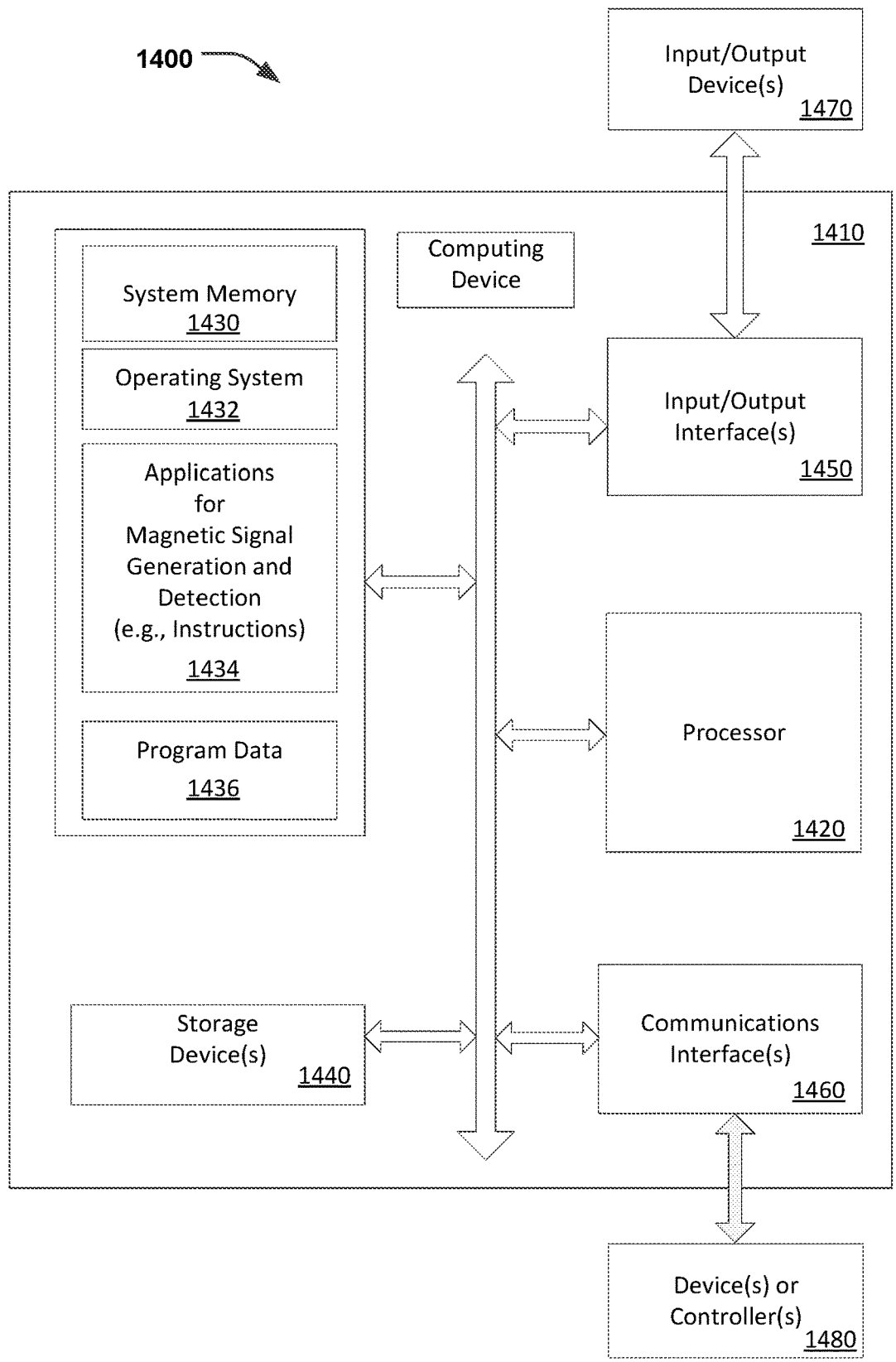
FIG. 14 is a block diagram of a computing environment according to a first embodiment that includes electronic components through which the described system may be implemented.

FIG. 14 is a block diagram 1400 of a computing environment according to a first embodiment that includes electronic components through which the described system may be implemented. The components in FIG. 14 support embodiments of computer-implemented methods and computer-executable program instructions or code according to the present disclosure. For example, the computing device 1410, or portions thereof, may execute instructions to form a magnetic detector such as magnetic detector 203 of FIG. 2 and magnetic detector 1100 of FIG. 11.

In FIG. 14, the computing device 1410 may include a processor 1420. The processor 1420 may communicate with the system memory 1430, one or more storage devices 1440 on which a storage data structure or database is located, one or more input/output interfaces 1450, one or more communications interfaces 1460, or a combination thereof.

The system memory 1430 may include volatile memory devices (e.g., random access memory (RAM) devices), nonvolatile memory devices (e.g., read-only memory (ROM) devices, programmable read-only memory, and flash memory), or both. The system memory 1430 may include an operating system 1432, which may include a basic/input output system for booting the computing device 1410 as well as a full operating system to enable the computing device 1410 to interact with users, other programs, and other devices. The system memory 1430 may include one or more applications 1434 which may be executable by the processor 1420, such as a method to generate magnetic fields and magnetic signals and to detect the same (e.g., method 1200 of FIG. 12 described herein). For example, the one or more applications 1434 may include instructions executable by the processor 1420. The system memory 1430 may include program data 1436 based on signals from magnetic materials of magnetic tags, identities of magnetic materials, index numbers, retail and other commercial data, time stamps, and so forth.

The processor 1420 may also communicate with one or more storage devices 1440. For example, the one or more storage devices 1440 may include nonvolatile storage devices, such as magnetic disks, optical disks, or flash memory devices. The storage devices 1440 may include both removable and non-removable memory devices. The storage devices 1440 may be configured to store an operating system, images of operating systems, applications, and program data. In a particular embodiment, the memory 1430, the storage devices 1440, or both, include tangible non-transitory computer-readable media.

The processor 1420 may also communicate with one or more input/output interfaces 1450 that enable the computing device 1410 to communicate with one or more input/output devices 1470 to facilitate user interaction. The input/output interfaces 1450 may include serial interfaces (e.g., universal serial bus (USB) interfaces or Institute of Electrical and Electronics Engineers (IEEE) 1394 interfaces), parallel interfaces, display adapters, audio adapters, and other interfaces. The input/output devices 1470 may include keyboards, pointing devices, displays, speakers, microphones, touch screens, magnetic field generation devices, magnetic field detection devices, and other devices. The processor 1420 may detect interaction events based on user input received via the input/output interfaces 1450. Additionally, the processor 1420 may send a graphical user interface (GUI) and related elements to a display device via the input/output interfaces 1450.

The processor 1420 may communicate with devices or controllers 1480 via the one or more communications interfaces 1460. The one or more communications interfaces 1460 may include wired Ethernet interfaces, IEEE 802 wireless interfaces, other wireless communication interfaces, or other network interfaces. The devices or controllers 1480 may include host computers, servers, workstations, and other computing devices.

In particular embodiments, a computer system may be usable to enable electromagnetic signal generation and detection. For example, the applications 1434 may be executable by the processor 1420 to scan UPC tags of merchandise bearing magnetic tags, scan payment card or other payment means, determine whether payment is available, determine presence of magnetic tags, disable a security feature of magnetic tags, communicate with door alarms, communicate with servers, identify magnetic tags, determine whether merchandise associated with magnetic tags is authorized for exiting a retail premises, record a presence of a set of magnetic tags, generate retail analytics, generate timestamps, and generate alarms. or any combination thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A coded tag comprising:
    a substrate;
    a first magnetic material associated with the substrate, the first magnetic material having a first magnetic characteristic and encoding first information based on the first magnetic characteristic; and
    a second magnetic material associated with the substrate, the second magnetic material encoding second information and having a second magnetic characteristic different from the first magnetic characteristic, the second information encoded based on the second magnetic characteristic.

2. The coded tag of claim 1, wherein the first magnetic material corresponds to a first magnetic ink applied over a first area of the substrate, and wherein the second magnetic material corresponds to a second magnetic ink applied over a second area of the substrate.

3. The coded tag of claim 2, wherein the first magnetic ink has a first resonant frequency at an applied magnetic field strength, and wherein the second magnetic ink has a second resonant frequency at the applied magnetic field strength.

4. The coded tag of claim 1, wherein the first information corresponds to a first alphanumeric character, and wherein the second information corresponds to a second alphanumeric character.

5. The coded tag of claim 1, wherein the substrate includes a package label.

6. The coded tag of claim 5, wherein the package label includes a product code encoding a set of digits, and wherein the first magnetic material and the second magnetic material are printed as part of encoding elements of the product code.

7. The coded tag of claim 1, wherein the substrate includes a first layer of packaging material and a second layer of packaging material.

8. The coded tag of claim 7, wherein the first layer includes the first magnetic material, and wherein the second layer includes the second magnetic material.

9. The coded tag of claim 1, wherein the first magnetic material has a first coercivity value, and wherein the second magnetic material has a second coercivity value different from the first coercivity value.

10. The coded tag of claim 1, wherein the first magnetic material includes one of a magnetite, an acicular magnetite, a ferric oxide, or a chromium dioxide, wherein the second magnetic material includes one of a magnetite, an acicular magnetite, a ferric oxide, or a chromium dioxide, and wherein the substrate includes one of tape, a tag, a ticket, a receipt, a sticker, fiat currency, a boarding pass, a passport, or an identification card.

11. The coded tag of claim 1, wherein the first magnetic material corresponds to a first magnetic ink, and wherein the second magnetic material corresponds to a second magnetic ink, the first magnetic ink having the first magnetic characteristic and encoding the first information, and the second magnetic ink having the second magnetic characteristic and encoding the second information.

12. The coded tag of claim 1, wherein the first magnetic material is associated with a first surface area of the substrate, and wherein the second magnetic material is associated with a second surface area of the substrate.

13. The coded tag of claim 12, wherein the first surface area is distinct from the second surface area.

14. A magnetic detector system comprising:
a transmitter configured to:
transmit a first magnetic detection signal at a first magnetic frequency; and
transmit a second magnetic detection signal at a second magnetic frequency; and
a detector configured to detect, based on a first response from a first magnetic material to the first magnetic detection signal and based on a second response from a second magnetic material to the second magnetic detection signal, a presence of the first magnetic material and the second magnetic material associated with a substrate of a coded tag, the first magnetic material having a first magnetic characteristic and encoding first information based on the first magnetic characteristic, and the second magnetic material having a second magnetic characteristic and encoding second information based on the second magnetic characteristic.

15. The magnetic detector system of claim 14, wherein the detector is further configured to generate a timestamp at a time associated with detection of the first magnetic material and the second magnetic material.

16. The magnetic detector system of claim 14, wherein the first magnetic material corresponds to a first magnetic ink and the second magnetic material corresponds to a second magnetic ink, and wherein the detector is further configured to:
identify a first alphanumeric value based on the first response from the first magnetic ink; and
identify a second alphanumeric value based on the second response from the second magnetic ink.

17. The magnetic detector system of claim 16, wherein the detector is further configured to send data indicating a presence of the substrate by communicating at least the first alphanumeric value and the second alphanumeric value to a security system.

18. The magnetic detector system of claim 17, wherein the security system corresponds to a security system of a retail establishment.

19. The magnetic detector system of claim 14, wherein the first magnetic material corresponds to a first magnetic ink and encodes first information, and wherein the second magnetic material corresponds to a second magnetic ink and encodes second information.

20. The magnetic detector system of claim 14, further comprising a memory storing a lookup table, wherein the detector is further configured to:
determine that the first response from the first magnetic material corresponds to first information stored in the lookup table; and
determine that the second response from the second magnetic material corresponds to second information stored in the lookup table.

* * * * *